(12) United States Patent
Kamijo et al.

(10) Patent No.: US 7,483,099 B2
(45) Date of Patent: Jan. 27, 2009

(54) LIQUID CRYSTAL DEVICE AND ELECTRONIC APPARATUS

(75) Inventors: Kimitaka Kamijo, Shiojiri (JP); Hideki Kaneko, Tottori (JP); Katsuhiro Imai, Minowa-machi (JP); Tomoyuki Nakano, Azumino (JP)

(73) Assignee: Epson Imaging Devices Corporation, Azumino-Shi (JP)

( * ) Notice: Subject to any disclaimer, the term of this patent is extended or adjusted under 35 U.S.C. 154(b) by 540 days.

(21) Appl. No.: 11/354,194

(22) Filed: Feb. 15, 2006

(65) Prior Publication Data

US 2006/0215088 A1 Sep. 28, 2006

(30) Foreign Application Priority Data

Mar. 28, 2005 (JP) ............................. 2005-090716

(51) Int. Cl.
*G02F 1/1335* (2006.01)
(52) U.S. Cl. ..................... 349/114; 349/71; 349/106; 349/96; 349/113
(58) Field of Classification Search ............... 349/71, 349/106, 96, 113, 114; 359/296
See application file for complete search history.

(56) References Cited

U.S. PATENT DOCUMENTS

2005/0219446 A1* 10/2005 Hisatake ............... 349/114
2006/0197898 A1* 9/2006 Kurasawa ............... 349/117
2007/0177082 A1* 8/2007 Imayama et al. ............ 349/114
2008/0204640 A1* 8/2008 Wada ........................ 349/114

FOREIGN PATENT DOCUMENTS

| JP | A 2003-84313 | 3/2003 |
| JP | A 2004-325822 | 11/2004 |
| JP | A 2004-354507 | 12/2004 |

* cited by examiner

*Primary Examiner*—James P Hughes
(74) *Attorney, Agent, or Firm*—Oliff & Berridge, PLC

(57) ABSTRACT

A liquid crystal device includes a pair of substrates that face each other, a liquid crystal layer that is interposed between the pair of substrates, electrodes that are formed on opposing surfaces of the pair of substrates so as form a plurality of subpixel regions, in each of which a reflective display region having a light-reflective film reflecting light and a transmissive display region transmitting light are provided, and an insulating layer that is formed between one of the pair of substrates and the liquid crystal layer such that a thickness of the liquid crystal layer in the reflective display region is smaller than a thickness of the liquid crystal layer in the transmissive display region. The insulating layer is formed to have a first film thickness in the reflective display region, and is provided between the transmissive display region of a predetermined subpixel region and the transmissive display region of a subpixel region adjacent to the predetermined subpixel region. A portion of the insulating layer is formed to have a film thickness smaller than the first film thickness between the transmissive display region of the predetermined subpixel region and the transmissive display region of the subpixel region adjacent to the predetermined subpixel region.

12 Claims, 18 Drawing Sheets

(II-II SECTION)

(EXPANDED III—III SECTION)

(IV-IV SECTION)

FIG. 7 (EXPANDED VII–VII SECTION)

(IX—IX SECTION)

(EXPANDED XI-XI SECTION)

(XII-XII SECTION)

(XIII–XIII SECTION)

LIQUID CRYSTAL DEVICE AND ELECTRONIC APPARATUS

BACKGROUND

1. Technical Field

The present invention relates to a liquid crystal device in which, in a subpixel region serving as a minimum unit of display, a thickness of a liquid crystal layer is changed in a reflective display region and a transmissive display region. Further, the present invention relates to an electronic apparatus having such a liquid crystal device.

2. Related Art

At present, liquid crystal devices are widely used for electronic apparatuses, such as cellular phones, personal digital assistants, or the like. For example, when various kinds of information on the electronic apparatus are displayed in forms of images, such as characters, numerals, graphics, or the like. In such a liquid crystal device, a plurality of subpixel regions serving as minimum units of display are arranged in a matrix shape in horizontal and vertical directions in a plane of a liquid crystal layer so as to form a display region. Further, by controlling the alignment of liquid crystal molecules in the liquid crystal layer for each subpixel region, light passing through the liquid crystal layer is modulated for each subpixel region, such that display is performed.

In the above-described liquid crystal device, a so-called transflective liquid crystal device has been known. In the transflective liquid crystal device, two regions of a reflective display region and a transmissive display region are provided in each of a plurality of subpixel regions. In this case, reflective display in which external light, such as sunlight, indoor light, or the like is reflected by the reflective display region and display is performed by use of reflected light, and transmissive display in which light from an illumination device serving as a backlight passes through the transmissive display region and display is performed by use of transmitted light can be selectively performed (for example, see JP-A-2003-084313 (page 5 and FIGS. 1A and 1B).

Further, in the related art liquid crystal device, a technology has been known in which the thickness of the liquid crystal layer in the transmissive display region is set larger than the thickness of the liquid crystal layer in the reflective display region, such that the length of an optical path at the time of transmissive display and the length of an optical path at the time of reflective display are made equal or close to each other (for example, see JP-A-2003-084313). In JP-A-2003-084313, a region where a resin film having a proper thickness is provided and a region where a resin film is not formed are formed in one subpixel region, such that the thickness of the liquid crystal layer is changed.

SUMMARY

JP-A-2003-084313 does not clearly describe how the thickness of the resin film is set among a plurality of transmissive display regions. It is conceivable to do this in the manner shown in FIG. 17. That is, the entire region between adjacent transmissive display regions T can be buried with an insulating layer (that is, interlayer insulating film) 81 having a large film thickness for a reflective display region. In this case, however, the insulating layer 81 existing among the plurality of transmissive display regions T can get in the way when coating an alignment film 82, so it becomes difficult to uniformly coat the material of the alignment film 82. As a result, the film thickness of the alignment film 82 may not be uniform at the plurality of transmissive display regions T where the film thickness of the insulating layer 81 is smaller (that is, zero in case of FIG. 17). If the thickness of the alignment film 82 is not uniform, then the thickness t2 of the liquid crystal layer corresponding to the individual transmissive display regions T will not be uniform, so that a vivid image may be not displayed.

Alternatively, it is conceivable to set the thickness of the resin film among the plurality of transmissive display regions as shown in FIG. 18. That is, the film thickness of the insulating layer 81 between adjacent transmissive display regions T can be formed smaller (in case of FIG. 18, the film thickness of zero) than the film thickness for a reflective display region for all regions between the transmissive display regions T. In doing so, the insulating layer 81 will not get in the way when coating the material of the alignment film 82, and thus the alignment film 82 can be uniformly coated among the plurality of transmissive display regions T. Accordingly, the thickness t2 of the liquid crystal layer corresponding to the individual transmissive display regions T can be made uniform. In this case, however, although the reflective display region is provided between adjacent transmissive display regions T, the thickness of the liquid crystal layer corresponding to the reflective display region has the large thickness of that used for the transmissive display region, and thus vivid display cannot be performed.

An advantage of some aspects of the invention is that it provides a liquid crystal device in which a film thickness of an insulating layer is changed between a reflective display region and a transmissive display region, such that a thickness of a liquid crystal layer is changed between the two regions. More particularly, an advantage of some aspects of the invention is that it provides a liquid crystal device in which the insulating layer can be provided between adjacent transmissive display regions such that the thickness of the liquid crystal layer is suitably set and an alignment film can be formed so as to have a uniform film thickness among a plurality of transmissive display regions even when the insulating layer is provided between the transmissive display regions.

According to an aspect of the invention, a liquid crystal device includes a pair of substrates that face each other, a liquid crystal layer that is interposed between the pair of substrates, electrodes that are formed on opposing surfaces of the pair of substrates so as form a plurality of subpixel regions, in each of which a reflective display region having a light-reflective film reflecting light and a transmissive display region transmitting light are provided, and an insulating layer that is formed between one of the pair of substrates and the liquid crystal layer such that a thickness of the liquid crystal layer in the reflective display region is smaller than a thickness of the liquid crystal layer in the transmissive display region. The insulating layer is formed to have a first film thickness in the reflective display region, and is provided between the transmissive display region of a predetermined subpixel region and the transmissive display region of a subpixel region adjacent to the predetermined subpixel region. A portion of the insulating layer is formed to have a film thickness smaller than the first film thickness between the transmissive display region of the predetermined subpixel region and the transmissive display region of the subpixel region adjacent to the predetermined subpixel region.

In the liquid crystal device according to the aspect of the invention, the insulating layer is provided between adjacent transmissive display regions, and thus the thickness of the liquid crystal device of that region is maintained to have a suitable thickness for the reflective display region. For this reason, reflective display, which is performed by use of reflected light, can be vividly performed. Further, since the portion of the insulating layer existing between adjacent transmissive display regions is formed to have the film thickness smaller than the first film thickness, the material of an alignment film can be more uniformly coated on the surface of the insulating layer, as compared with the entire region is buried with the insulating layer having the first film thickness.

As such, according to the aspect of the invention, a function of adjusting the thickness of the liquid crystal layer by use of the insulating layer can be sufficiently achieved, and the alignment film can be formed to have a uniform thickness on the surface of the insulating layer, even when the film thickness of the insulating layer differs between the reflective display region and the transmissive display region. As a result, reflective display and transmissive display in a transflective liquid crystal device can be performed with uniform and high display quality.

Next, in the liquid crystal device according to the aspect of the invention, it is preferable that the insulating layer, which makes the thickness of the liquid crystal layer in the reflective display region smaller than the thickness of the liquid crystal layer in the transmissive display region, be not provided in the transmissive display region. According to this configuration, since it is sufficient that the film thickness of the insulating layer is managed only in the reflective display region, a processing of forming the insulating layer is simplified.

Next, in the liquid crystal device according to the aspect of the invention, it is preferable that a thickness of the liquid crystal layer in the portion formed to have the film thickness smaller than the first film thickness be substantially equal to the thickness of the liquid crystal layer in the transmissive display region. This means that the insulating layer is not formed in a portion existing between adjacent transmissive display regions. According to this configuration, the insulating layer, which is an obstacle when the material of the alignment film is coated on the insulating layer, is completely removed in that portion. For this reason, flowability of the material of the alignment film can be favorably ensured, and thus the alignment film can be formed to have the uniform thickness.

Next, in the liquid crystal device according to the aspect of the invention, it is preferable that the insulating layer be not formed in the portion formed to have the film thickness smaller than the first film thickness. Further, in the liquid crystal device according to the aspect of the invention, it is preferable that the insulating layer between the transmissive display region of the predetermined subpixel region and the transmissive display region of the subpixel region adjacent to the predetermined subpixel region be formed to have the first film thickness.

Next, the liquid crystal device according to the aspect of the invention preferably further includes a light-shielding film that shields the portion formed to have the film thickness smaller than the first film thickness. The thickness of the liquid crystal layer in the portion where the insulating layer is formed to have a third film thickness, that is, a film thickness smaller than the first film thickness suitable for the reflective display region may not have a suitable thickness for the reflective display region. If any measure is not taken against this problem, display quality at the time of reflective display, which is performed by use of light reflected by the reflective display region, may be degraded. In contrast, like the above-described configuration, if the portion where the insulating layer is set to have the third thickness is shielded by the light-shielding film, display quality can be prevented from being degraded.

Next, in the liquid crystal device according to the aspect of the invention, it is preferable that the transmissive display region be in a long shape in one direction in plan view, and the portion formed to have the film thickness smaller than the first film thickness be a portion of a side in a longitudinal direction of the transmissive display region. According to this configuration, flowability of the material of the alignment film can be favorably ensured.

Next, in the liquid crystal device according to the aspect of the invention, it is preferable that the transmissive display region extend in a predetermined direction through the portion formed to have the film thickness smaller than the first film thickness, and a light-shielding film be provided between adjacent subpixel regions in a direction crossing the predetermined direction. According to this configuration, the portion where display quality is concerned to be degraded when the insulating layer is formed to have the third film thickness smaller than the first film thickness is shielded by the light-shielding film, and thus display quality can be prevented from being degraded.

Next, in the liquid crystal device according to the aspect of the invention, it is preferable that a resin film having a concavo-convex pattern, which causes a surface of the light-reflective film to have concavo-convexes, be formed below the light-reflective film, and the insulating layer be formed of the resin film. The insulating layer can be formed of an arbitrary material by an arbitrary process, but, as described above, the insulating film can be formed of the resin film, which is provided as a base of the light reflective film. In this case, manufacturing costs when the insulating layer is formed can be suppressed.

Next, in the liquid crystal device according to the aspect of the invention, it is preferable that, when a width of the insulating layer in the portion formed to have the film thickness smaller than the first film thickness in a longitudinal direction of the transmissive display region is W3, and a width of the insulating layer provided between the transmissive display region of the predetermined subpixel region and the transmissive display region of the subpixel region adjacent to the predetermined subpixel region in the longitudinal direction of the transmissive display region is W1, the condition W3<W1 be established. According to this configuration, the region having the first film thickness suitable for the reflective display region becomes large, and thus high-quality display can be realized.

Next, in the liquid crystal device according to the aspect of the invention, it is preferable that, when a width of the insulating layer in the portion formed to have the film thickness smaller than the first film thickness in a longitudinal direction of the transmissive display region is W3, and a width of the insulating layer provided between the transmissive display region of the predetermined subpixel region and the transmissive display region of the subpixel region adjacent to the predetermined subpixel region in the longitudinal direction of the transmissive display region is W1, the condition W3<W1/2 be established. According to this configuration, the region having the first film thickness suitable for the reflective display region further becomes large, and thus high-quality display can be realized.

Next, according to another aspect of the invention, an electronic apparatus includes the liquid crystal device having the above-described configuration. According to the liquid crystal device of the invention, the function of adjusting the thickness of the liquid crystal layer by use of the insulating layer can be sufficiently achieved, and the alignment film can be formed to have the uniform thickness on the surface of the insulating layer, even when the film thickness of the insulating layer differs between the reflective display region and the transmissive display region. For this reason, according to the liquid crystal device of the aspect of the invention, vivid display can be performed with high display quality. As a result, in the electronic apparatus using the liquid crystal device according to the aspect of the invention, information on the electronic apparatus can be displayed with high display quality. As such an electronic apparatus, for example, a cellular phone, a personal digital assistant, an IC recorder, and other kinds of electronic apparatuses can be considered.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment of Liquid Crystal Device

Figure 1:
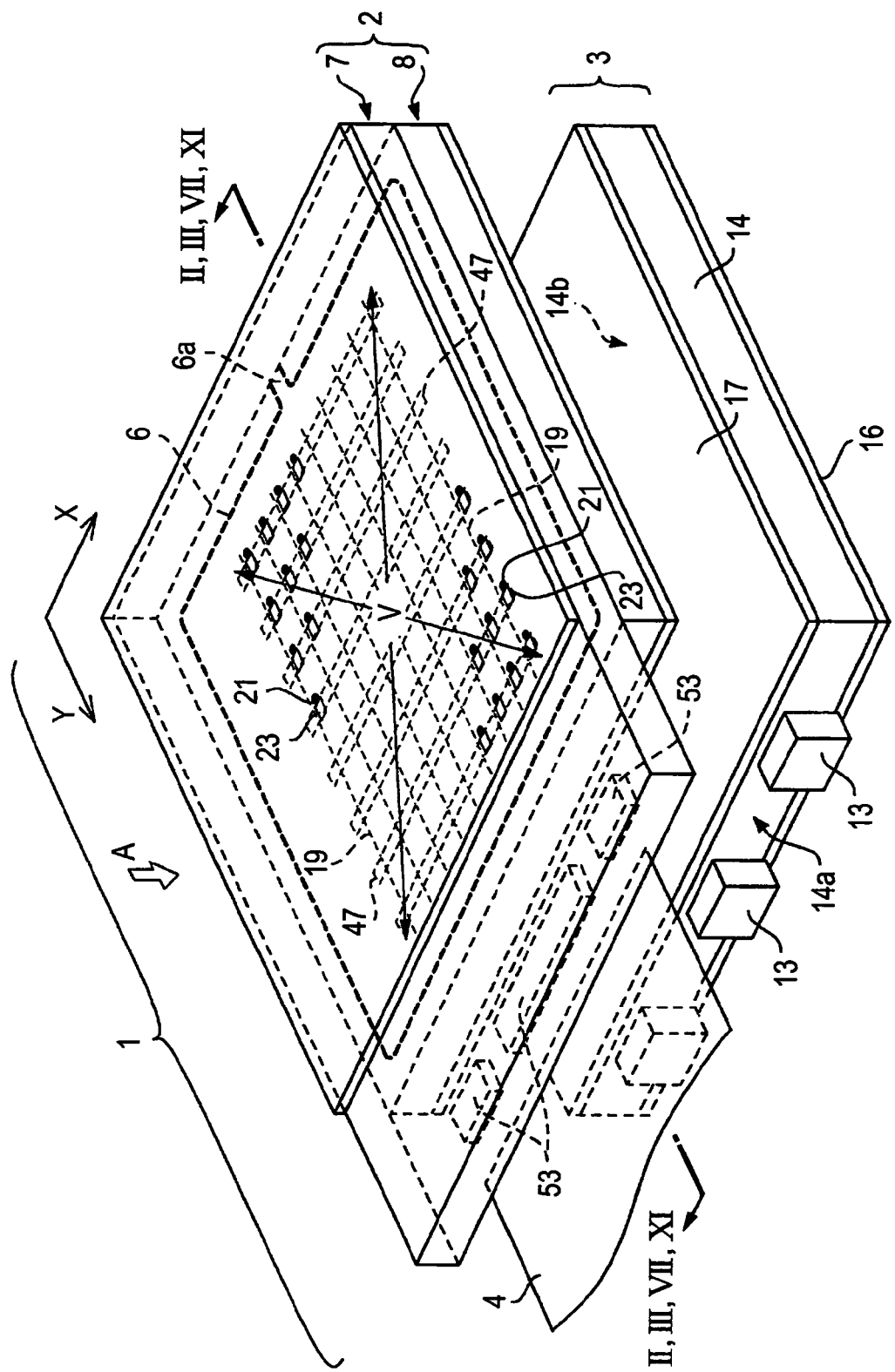
FIG. 1 is a perspective view showing an embodiment of a liquid crystal device according to the invention.

Hereinafter, a liquid crystal device according to the invention will be described by way of an embodiment. Moreover, it is needless to say that the invention is not limited to the embodiment. Further, in the following description, various structures are exemplified by use of the drawings, but it is necessary to take notice that the structures shown in the drawings have been shown to have different scales from the actual structures such that characteristic portions are easy to understand.

Figure 2:
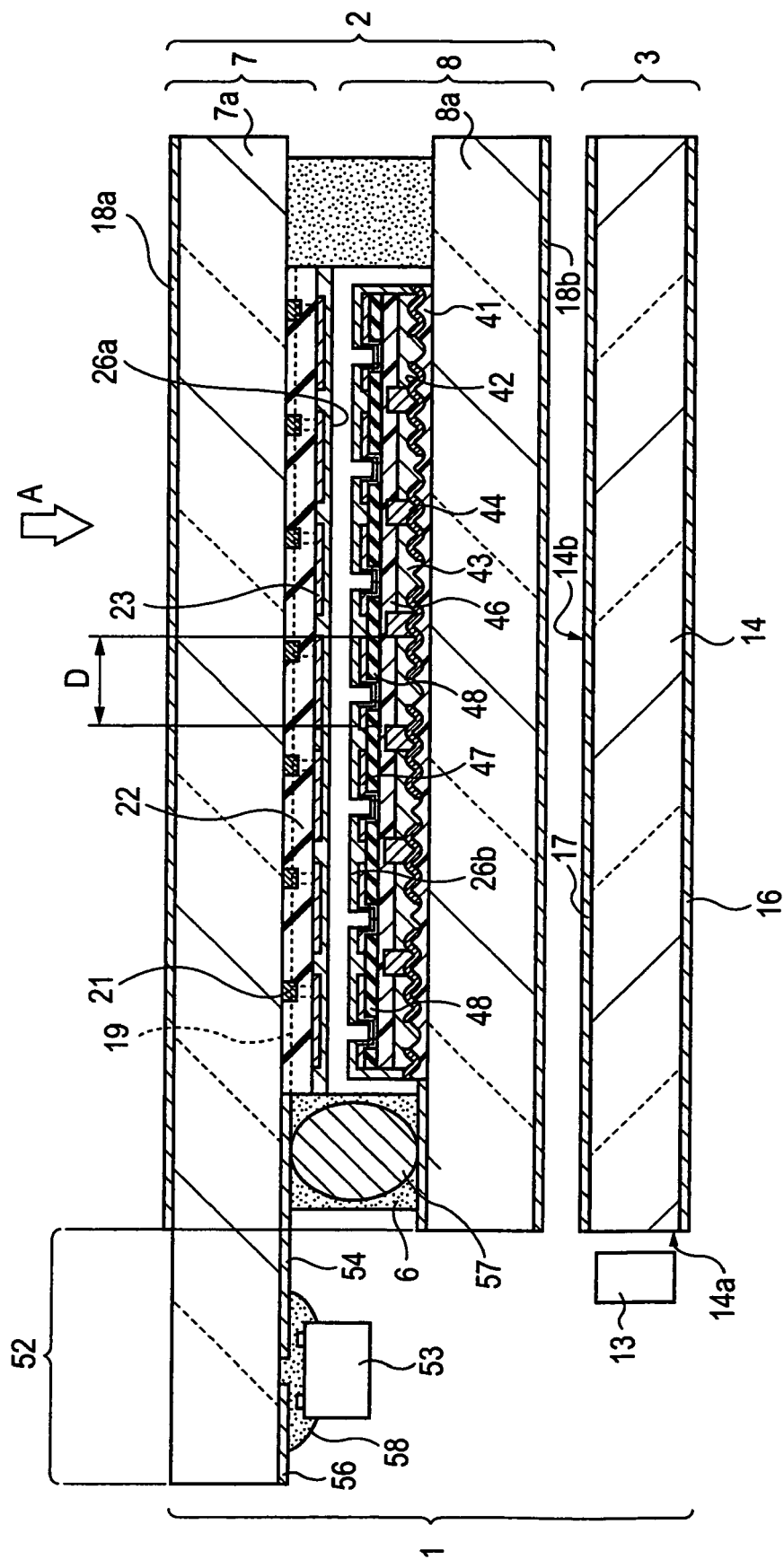
FIG. 2 is a side cross-sectional view taken along the line II-II of FIG. 1.
Figure 3:
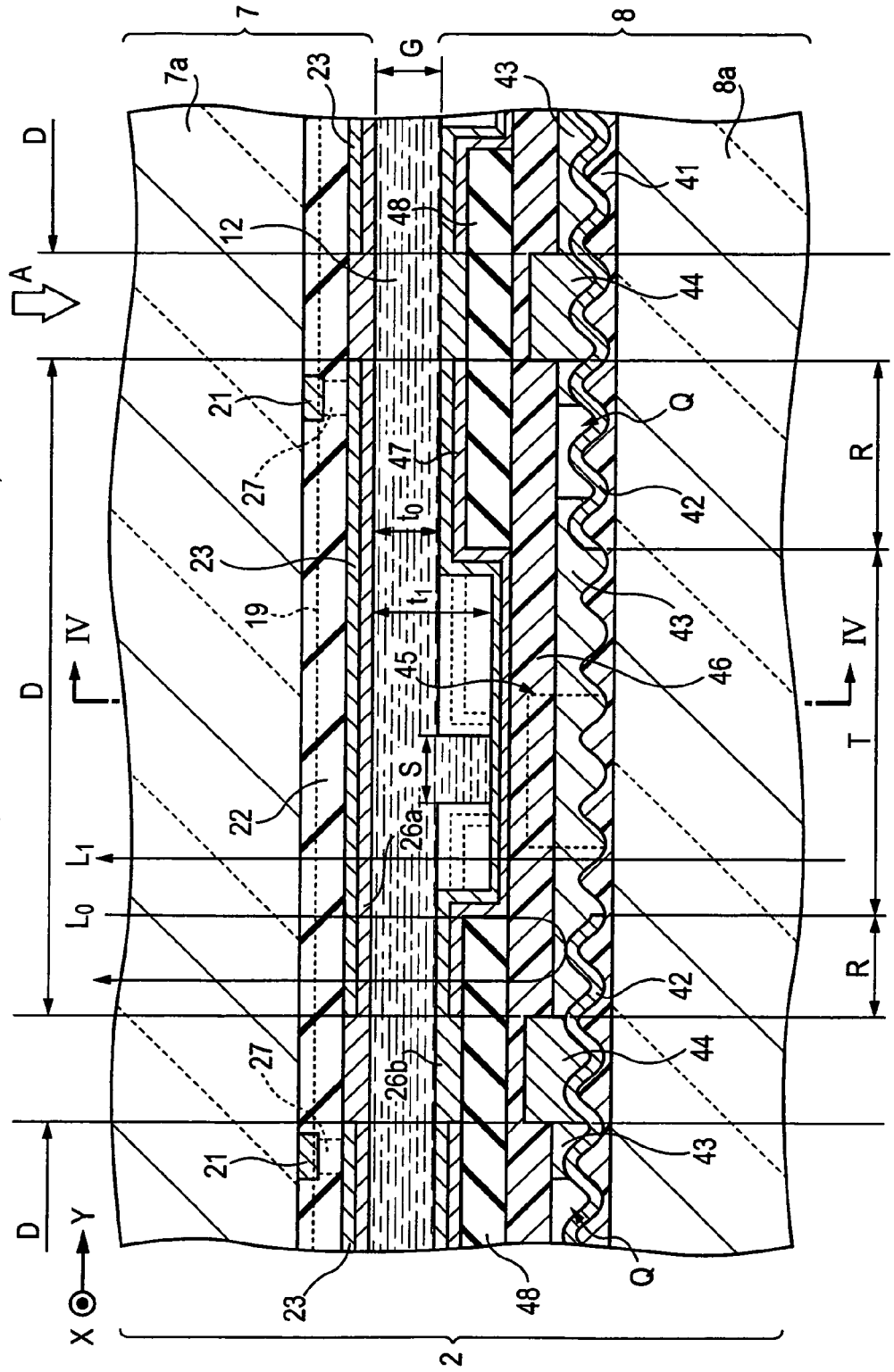
FIG. 3 is a cross-sectional view showing a pixel portion in FIG. 2 on a magnified scale.
Figure 4:
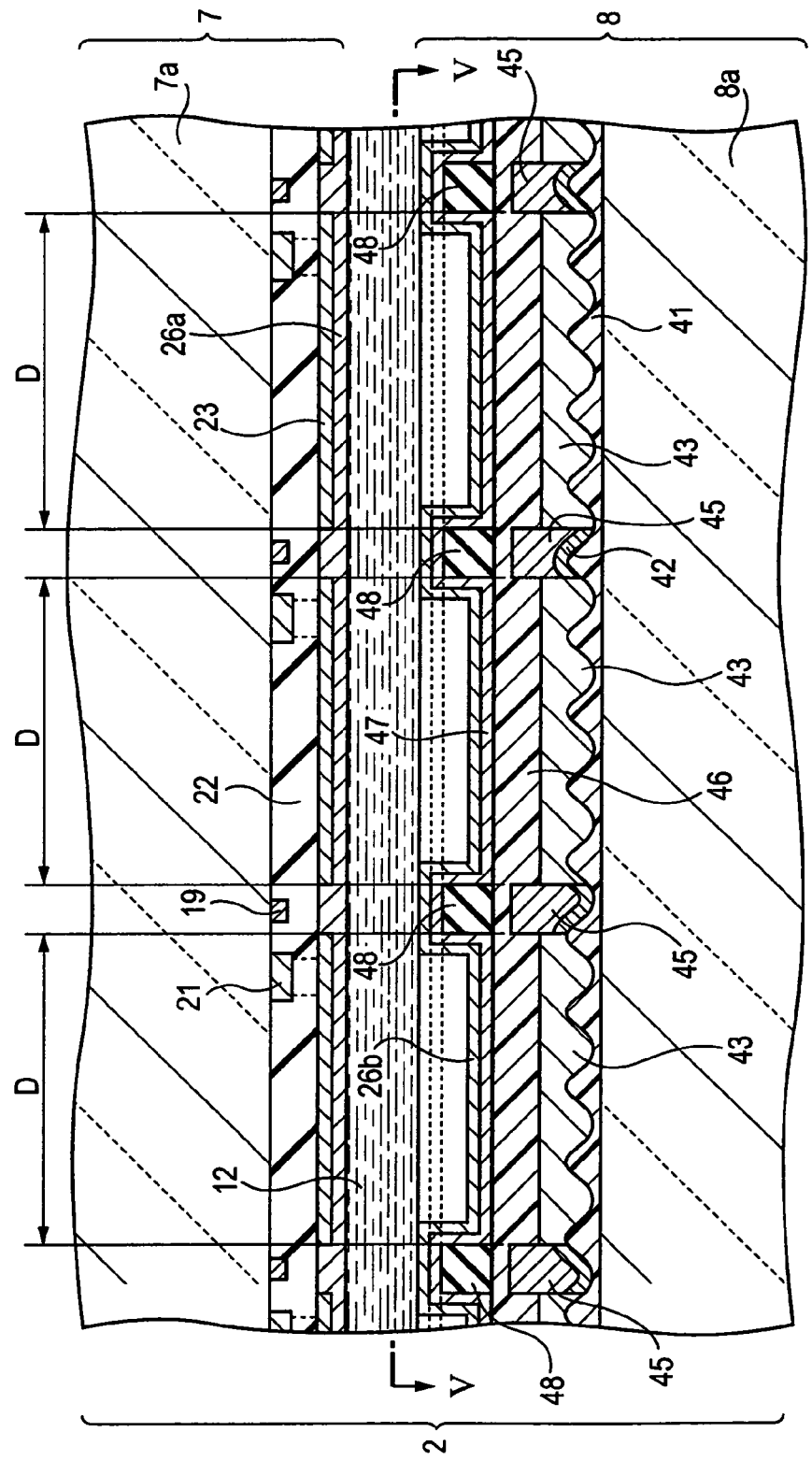
FIG. 4 is a cross-sectional view taken along the line IV-IV of FIG. 3.
Figure 5:
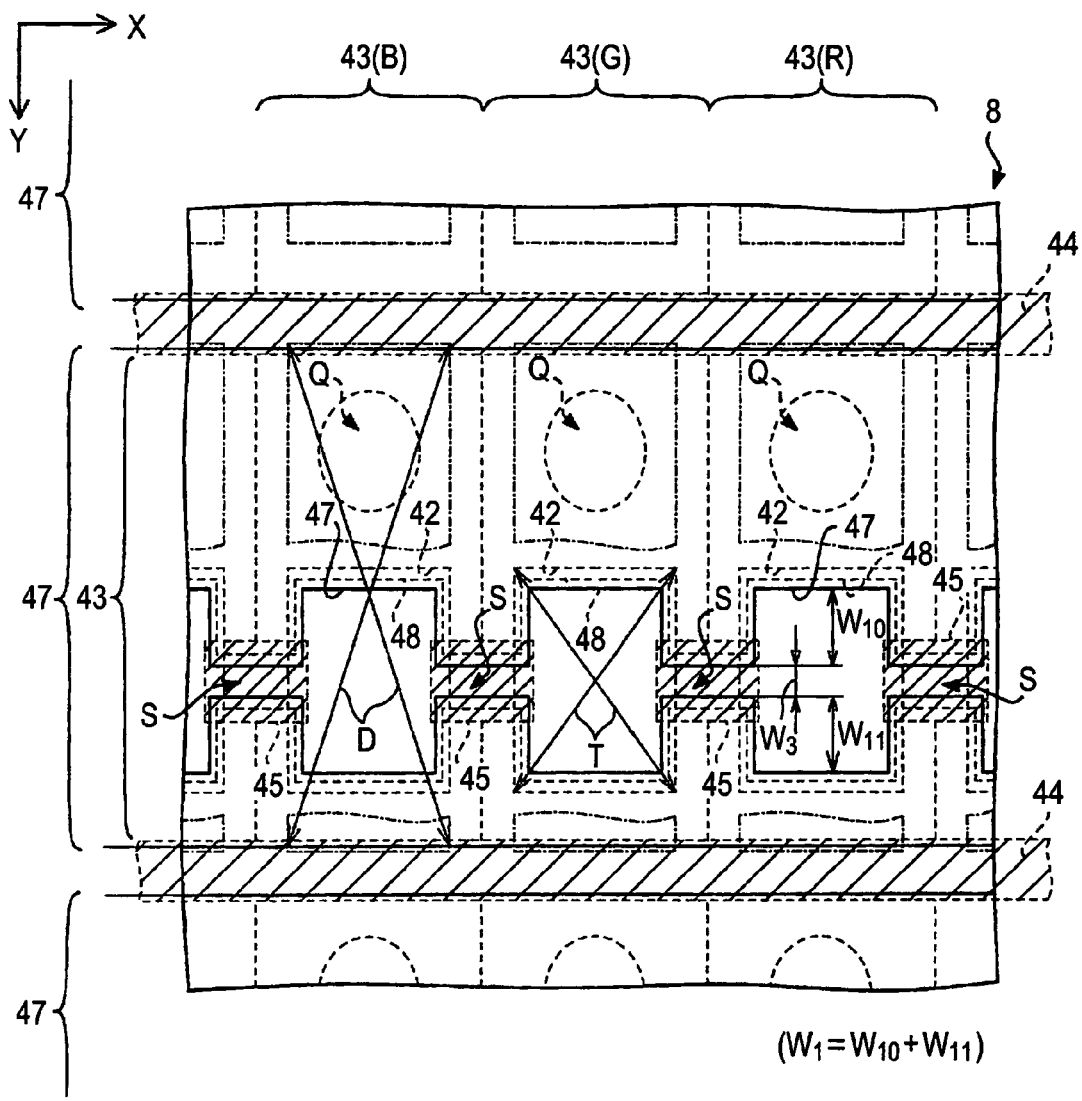
FIG. 5 is a plan cross-sectional view taken along the line V-V of FIG. 4.

FIG. 1 shows an embodiment of a liquid crystal device according to the invention. FIG. 2 is a side cross-sectional view taken along the line II-II of FIG. 1. FIG. 3 is a cross-sectional view showing a pixel portion in FIG. 2 on a magnified scale. FIG. 4 is a cross-sectional view taken along the line IV-IV of FIG. 3. FIG. 5 is a plan cross-sectional view taken along the line V-V of FIG. 4. In the present embodiment, the invention is applied to an active matrix-type liquid crystal device using a TFD (Thin Film Diode) element, which is a two-terminal-type nonlinear resistive element, as a switching element.

In FIG. 1, a liquid crystal device 1 has a liquid crystal panel 2 that serves as an electro-optical panel, an illumination device 3 that is attached to the liquid crystal panel 2, and an FPC (Flexible Printed Circuit) substrate 4 that serves as a wiring substrate connected to the liquid crystal panel 2. As regards the liquid crystal device 1, a side on which an arrow A is drawn is an observation side, and the illumination device 3 is arranged on a side opposite to the observation side of the liquid crystal panel 2 so as to function as a backlight.

The liquid crystal panel 2 has a pair of substrates 7 and 8 that are bonded to each other by a rectangular or square ring-shaped sealant 6. The substrate 7 is an element substrate on which switching elements are formed. Further, the substrate 8 is a color filter substrate on which color filters are formed. A liquid crystal injection hole 6a is provided in a portion of the sealant 6, and liquid crystal as an electro-optical material is injected between the element substrate 7 and the color filter substrate 8 through the liquid crystal injection hole 6a. The liquid crystal injection hole 6a is sealed by resin after liquid crystal is completely injected.

The illumination device 3 has LEDs (Light Emitting Diodes) 13 serving as a light source, and a light guide body 14. As the light source, in addition to a dot-like light source, such as the LED, a linear light source, such as a cold-cathode tube, can be used. The light guide body 14 is formed by film-forming a material of light-transmissive resin, for example. Here, a side surface facing the LEDs 13 is a light incident surface 14a, and a surface facing the liquid crystal panel 2 is a light emergent surface 14b. On a rear surface of the light guide body 14 as viewed from the observation side indicated by the arrow A, if necessary, a light reflective layer 16 is provided. Further, on the light emergent surface 14b of the light guide body 14, if necessary, a light diffusing layer 17 is provided.

Referring to FIG. 2, the element substrate 7 has a first light-transmissive substrate 7a. The first light-transmissive substrate 7a is formed of light-transmissive glass, light-transmissive plastic, or the like. On an outer surface of the first light-transmissive substrate 7a, a polarizing plate 18a is mounted, for example, by adhesion. If necessary, an optical element other than the polarizing plate 18a, for example, a phase plate is additionally provided. On the other hand, on an inner surface of the first light-transmissive substrate 7a, as shown in FIG. 3, a plurality of data lines 19 are formed in parallel in a direction perpendicular to the paper (that is, row direction X of FIG. 1). Each of the data lines 19 extends in a horizontal direction of FIG. 3 (that is, column direction Y of FIG. 1). In addition, a plurality of TFD (Thin Film Diode) elements 21, which are nonlinear resistive elements to function as the switching elements, are formed along the data lines 19 to be correspondingly connected to the data lines 19.

An over-layer 22 is formed so as to cover the TFD elements 21 and the data lines 19. The over-layer 22 is formed by patterning resin having light-transmittance, photosensitivity, and insulation, for example, acrylic resin through a photolithography treatment. On the surface of the over-layer 22, a plurality of pixel electrodes 23 are formed. The pixel electrodes 23 are formed of, for example, a metal oxide, such as ITO (Indium Tin Oxide) or the like. As shown in FIG. 1, the plurality of pixel electrodes 23 are formed in dot shapes, which are arranged in horizontal and vertical directions or row and column direction, that is, an X and Y directions in a matrix shape. In FIG. 3, an alignment film 26a is formed on the pixel electrodes 23. The alignment film 26a is formed of polyimide or the like. The alignment film 26a is subjected to an alignment treatment, for example, a rubbing treatment, such that initial alignment of liquid crystal molecules in the vicinity of the element substrate 7 is determined.

The over-layer 22 is formed so as to cover the data lines 19 and the TFD elements 21. The pixel electrodes 23 are formed on the over-layer 22. In the over-layer 22, contact holes 27 are formed to electrically connect the pixel electrodes 23 and the TFD elements 21. The contact holes 27 are formed simultaneously when the over-layer 22 is formed by the photolithography treatment. The contact holes 27 are formed at positions which do not overlap the pixel electrodes 23 but overlap TFD elements 21, in plan view.

Each of the TFD elements 21 is formed by stacking a first element electrode, an insulating film, and a second element electrode in that order. A laminated structure is called an MIM (Metal-Insulation-Metal) structure. The first element electrode is formed of, for example, tantalum (Ta) or a Ta alloy. As the Ta alloy, for example, TaW (tantalum tungsten) can be used. The insulating film is formed by an anodization treatment, for example. The second element electrode is formed of, for example, Cr, molybdenum tungsten ally, or the like.

One of the first element electrode and the second element electrode extends from a corresponding one of the data lines 19. Further, the other of the first element electrode and the second element electrode is connected to a corresponding one of the pixel electrodes 23. Each of the TFD elements 21 can be formed in the simple MIM structure or a so-called back-to-back structure. The back-to-back structure is a TFD element structure in which two MIM structures having opposing electrical polarities are connected in series.

As described above, the over-layer 22 is provided below the pixel electrodes 23, and thus the layer of the pixel electrodes 23 and the layer of the TFD elements 21 are separated. This structure can effectively use the surface of the element substrate 7 of FIG. 2, as compared with a structure in which the pixel electrodes 23 and the TFD elements 21 are formed in the same layer. For example, an area of each of the pixel electrodes 23, that is, a pixel area, can be made large, and thus display on the liquid crystal device 1 can be easily viewed.

In FIG. 2, the color filter substrate 8 facing the element substrate 7 has a rectangular or square second light-transmissive substrate 8a as viewed from the observation side indicated by the arrow A. The second light-transmissive substrate 8a is formed of, for example, light-transmissive glass, light-transmissive plastic, or the like. On an outer surface of the second light-transmissive substrate 8a, a polarizing plate 18b is mounted, for example, by adhesion. If necessary, an optical element other than the polarizing plate 18b, for example, a phase plate, can be additionally provided.

On an inner surface of the second light-transmissive substrate 8a, as shown in FIG. 3, a resin film 41 is formed, and then a light-reflective film 42 is formed thereon. The light-reflective film 42 is formed of, for example, aluminum (Al), an Al alloy, or the like. On the light-reflective film 42, a plurality of colored elements 43 are formed, light-shielding films 44 are formed among the colored elements 43. Each of the light-shielding films 44 extends in a direction perpendicular to the paper of FIG. 3. The light-shielding films 44 can be formed of a light-shielding metal material, such as Cr or the like. Further, the light-shielding films 44 can be formed by stacking the colored elements 43 of different colors, for example, the colored elements 43 of three colors of R (red), G (green), and B (blue), or by stacking the colored elements 43 of two colors from the three colors. A layer in which the colored elements 43 and the light-shielding films 44 are formed forms a color filter layer.

Figure 6:
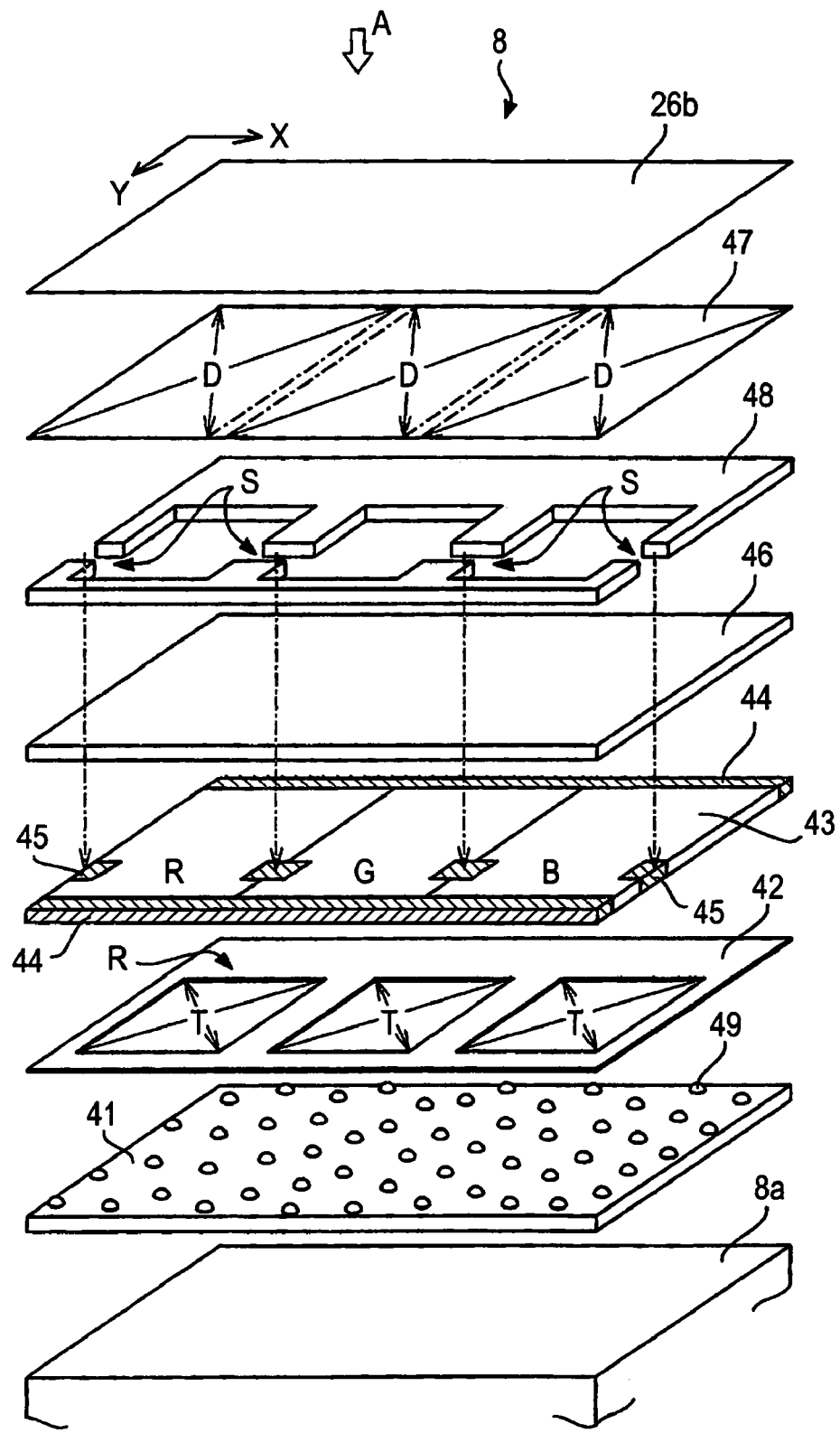
FIG. 6 is a diagram showing a laminated state of individual parts on a color filter substrate in exploded view for ease of understanding.

An overcoat layer 46 is formed on the colored elements and the light-shielding films 44, an insulating layer 48, which also serves as a liquid-crystal-layer thickness adjusting film, is formed thereon, a plurality of strip-shaped electrodes 47 are formed thereon, and an alignment film 26b is formed thereon. The insulating layer 48 also functions as a liquid-crystal-layer thickness adjusting film for adjusting the thickness of the liquid crystal layer. The strip-shaped electrodes 47 linearly extend in a direction perpendicular to the paper. Further, the alignment film 26b is subjected to an alignment treatment, for example, a rubbing treatment, such that initial alignment of liquid crystal molecules in the vicinity of the color filter substrate 8 is determined. FIG. 6 shows a laminated state of individual parts on the color filter substrate 8 in exploded view for ease of understanding.

As shown in FIG. 6, on the surface of the resin film 41, convex portions or concave portions are formed so as to form a concavo-convex pattern 49. The concavo-convex pattern 49 is randomly (that is, irregularly) arranged as viewed from the direction of the arrow A. By providing the concavo-convex pattern 49 on the surface of the resin film 41, the light-reflective film 42 laminated thereon also has the same concavo-convex pattern, as shown in FIG. 3. For this reason, light reflected by the light-reflective film 42 becomes scattered light. Accordingly, specular scattering in the light-reflective film 42 can be prevented from occurring.

The overcoat layer 46 is formed of photosensitive resin, such as acrylic resin, polyimide resin, or the like. The plurality of electrodes 47, which extend in strip shapes in the direction perpendicular to the paper in FIG. 3, are formed of a metal oxide, such as ITO or the like. Further, the alignment film 26b formed thereon is formed of polyimide or the like.

Next, in FIG. 3, the plurality of pixel electrodes 23 provided on the element substrate 7 are arranged in a matrix shapes in vertical and horizontal directions in plan view from the direction of the arrow A, that is, in a so-called dot matrix shape. That is, the plurality of pixel electrodes 23 are arranged linearly in the horizontal direction of FIG. 3, and are arranged linearly in the direction perpendicular to the paper of FIG. 3. On the other hand, the plurality of strip-shaped electrodes 47 provided on the color filter substrate 8 are arranged in the horizontal direction in FIG. 3 at the same interval, and extend in the direction perpendicular to the paper. From the above-described configuration, the pixel electrodes and the strip-shaped electrodes 47 overlap in plan view from the direction of the arrow A, and the overlap regions from subpixel regions D, each of which is a minimum unit of display. The subpixel regions D are arranged in a matrix shape in vertical and horizontal directions so as to form a display region V of FIG. 1, and images, such as characters, numerals, graphics, or the like, are displayed on the display region V.

The light-reflective film 42 of FIG. 3 is formed by a photo etching treatment, but, at the time of the photo etching treatment, as shown in FIG. 6, a partial region T of the light-reflective film 42 is removed for each subpixel region D. For this reason, in each subpixel region D, a region R where the light-reflective film 42 exists and a region T where the light-reflective film 42 does not exist are provided. As shown in FIG. 5, the region T where the light-reflective film 42 does not exist is formed in a rectangular shape at a position which is shifted from the center of the subpixel region D. Moreover, in general, the region T is not limited to a specified shape, such as a longitudinal shape or the like.

In FIG. 3, in each subpixel region D, the region R where the light-reflective film 42 exists is a reflective display region, and the region T where the light-reflective film 42 does not exist is a transmissive display region. External light incident from the observation side indicated by the arrow A, that is, external light L0 incident from the element substrate 7, is reflected by the reflective display region R. On the other hand, light L1 of FIG. 3 emergent from the light guide body 14 of the illumination device 3 of FIG. 2 transmits the transmissive display region T.

Each of the plurality of colored elements 43 is formed in a rectangular dot shape in correspondence with the subpixel region D as viewed from the direction of the arrow A. Each of the colored elements 43 is formed of a material through which one light component of three primary colors of B (blue), G (green), R (red) passes. In the present embodiment, the colored elements 43 are arranged in a stripe arrangement, that is, a color arrangement in which the same colors are arranged in the vertical direction of FIG. 5 (that is, the column direction Y), and different colors are arranged in the horizontal direction (that is, the row direction X of FIG. 5). As the arrangement, instead of the stripe arrangement, a delta arrangement, a mosaic arrangement, and other suitable arrangements can be selected. Moreover, the colored elements 43 may be formed of three primary colors of C (cyan), M (magenta), and Y (yellow).

In FIG. 3, as regards the color filter layer formed by the colored elements 43 and the light-shielding films 44, in a partial region Q of the color filter layer which exists in a region overlapping the reflective display region R of each subpixel region D in plan view, the corresponding colored element 43 is removed. As shown in FIG. 5, the region Q is formed in a circular shape, or an oval or elliptical shape. Of course, if necessary, other arbitrary shapes can be used. In the region Q where the colored element 43 is removed, the wavelength of light is not selected, and incident light passes through the region Q with no attenuation in intensity. For this reason, in the present embodiment, at the time of reflective display using light reflected by the reflective display region R, a bright image can be displayed.

Like the present embodiment, when color display is performed by use of the colored elements 43 of three colors of B, G, and R, three subpixel regions D corresponding to three colored elements 43 of three colors of B, G, and R form one pixel. On the other hand, when monochrome display is performed by use of white-black or one arbitrary color, one subpixel region D forms one pixel.

The light-shielding films 44 of FIG. 3 are formed of a light-shielding material, such as chromium (Cr) or the like. Further, the light-shielding films 44 can be formed by stacking, that is, laminating, the individual colored elements of B, G, and R or C, M, and Y constituting the colored elements 43 in two or three layers. As shown in an oblique line of FIG. 5, each of the light-shielding films 44 is formed in a linear shape, that is, a strip shape, so as to overlap an interval between adjacent strip-shaped electrodes 47 and 47 in plan view. The light-shielding films 44 shield the intervals extending in the row direction x among the plurality of strip-shaped electrodes 47. In the column direction Y on the color filter substrate 8, the light-shielding film is not provided. In FIG. 3, the light-shielding films 44 preferably have widths enough to shield the TFD elements 21 and the contact holes 27 provided on the element substrate 7 serving as the counter substrate.

When the element substrate 7 and the color filter substrate 8 having the above-described configurations are bonded to each other, as shown in FIG. 3, an interval, a so-called cell gap G, is formed between the substrates, and liquid crystal is filled in the cell gap G so as to form the liquid crystal layer 12. The interval of the cell gap G, that is, the thickness of the liquid crystal layer 12, is regularly maintained by a plurality of spacers (not shown) provided in the cell gap G. The spacers can be formed by randomly (that is, irregularly) disposing a plurality of spherical resin members on the surface of the element substrate 7 or the color filter substrate 8. Further, the spacers may be formed in columnar shapes at predetermined positions by a photolithography treatment. When the spacers are formed by the photolithography treatment, the spacers are preferably formed at positions overlapping the light-shielding films 44 in plan view.

Next, in FIG. 2, the first light-transmissive substrate 7a forming the element substrate 7 has an extended portion 52 extending outside the color filter substrate 8. On a surface of the extended portion 52 opposite to the observation side indicated by the arrow A, wiring lines 54 are formed by a photo etching treatment. A plurality of wiring lines 54 are formed to be arranged in parallel at the same interval in the direction perpendicular to the paper. Further, at a side end of the extended portion 52, a plurality of external connecting terminals 56 are formed to be arranged in parallel at the same interval in the direction perpendicular to the paper. Wiring lines to be formed on the FPC substrate 4 shown in FIG. 1 are conductively connected to the external connecting terminals 56 of FIG. 2, individually.

Some of the plurality of wiring lines 54 extend over the surface of the first light-transmissive substrate 7a so as to function as the data lines 19. Further, the remainder of the plurality of wiring lines 54 are conductively connected to the strip-shaped electrodes 47 provided on the color filter substrate 8 through conductive materials 57, which are randomly (that is, irregularly) included in the sealant 6. In FIG. 2, the conductive materials 57 are schematically shown in large scales but, actually, are smaller than the width of a section of the sealant 6. In general, in one section of the sealant 6, a plurality of conductive materials 57 are included.

On the surface of the extended portion 52, a driving IC 53 is mounted by a COG (Chip On Glass) technology using an ACF (Anisotropic Conductive Film) 58. In the present embodiment, as shown in FIG. 1, a plurality of driving ICs 53, for example, three, are mounted. For example, one driving IC 53 at the center transmits data signals to the data lines 19. On the other hand, the driving ICs 53 and 53 on both sides transmits scanning signals to the strip-shaped electrodes 47 formed on the color filter substrate 8. When the scanning signals are transmitted to the strip-shaped electrodes 47, the strip-shaped electrodes 47 function as the scanning lines.

According to the liquid crystal device 1 having such a configuration, as shown in FIG. 2, when the liquid crystal device 1 is disposed bright outdoors or bright indoors, reflective display is performed by use of external light, such as sunlight or indoor light. On the other hand, when the liquid crystal device 1 is disposed dark outdoors or dark indoors, transmissive display is performed by using the illumination device 3 as the backlight.

When reflective display is performed, as shown in FIG. 3, external light L0 incident on the liquid crystal panel 2 through the element substrate 7 from the observation side in the direction of the arrow A passes through the liquid crystal layer 12, is incident on the color filter substrate 8, and then is reflected by the light-reflective film 42 in the reflective display region R to be supplied to the liquid crystal layer 12 again. On the other hand, when transmissive display is performed, the light sources 13 of the illumination device 3 of FIG. 2 are turned on, and light from the light sources 13 is guided from the light incident surface 14a of the light guide body 14 to the light guide body 14, and exits from the light emergent surface 14b as planar light. Emergent light passes through the region in the transmissive display region T where the light-reflective film 42 does not exist and is supplied to the liquid crystal layer, as indicated by a symbol L1 of FIG. 3.

In such a manner, when light is supplied to the liquid crystal layer 12, a predetermined voltage, which is specified by the scanning signal and the data signal, is applied between the pixel electrode 23 on the element substrate 7 and the strip-shaped electrode 47 on the color filter substrate 8, and thus the alignment of the liquid crystal molecules in the liquid crystal layer 12 is controlled for each subpixel region D. As a result, light supplied to the liquid crystal layer 12 is modulated for each subpixel region D. When passing through the polarizing plate 18a on the element substrate 7 (see FIG. 2), modulated light is permitted or inhibited to transmit according to polarization characteristics of the polarizing plate 18a for each subpixel region D. Accordingly, the images, such as characters, numerals, graphics, or the like, are displayed on the surface of the element substrate 7, and are viewed from the direction of the arrow A.

In FIG. 3, the insulating layer 48 serving as the liquid-crystal-layer thickness adjusting film is provided to have a first film thickness in the reflective display region R and to have a second film thickness smaller than the first film thickness in the transmissive display region T. In the present embodiment, the second film thickness is set to zero, and the insulating layer 48 is not provided in the transmissive display region T. Accordingly, when the thickness of the liquid crystal layer 12 corresponding to the reflective display region R is t0, and the thickness of the liquid crystal layer 12 corresponding to the transmissive display region T is t1, the condition t1>t0 can be realized. When reflective display is performed, reflected light L0 passes through the liquid crystal layer 12 two times in a round-trip manner. In contrast, when transmissive display is performed, transmitted light L1 passes through the liquid crystal layer 12 only one time. Therefore, if the liquid crystal layer 12 is set to satisfy the condition t1=t0, display density may become irregular between reflective display and transmissive display. In contrast, like the present embodiment, if the liquid crystal layer 12 is set to satisfy the condition t1>t0, the length of an optical path crossing the liquid crystal layer 12 can be made constant between reflected light L0 and transmitted light L1, and thus uniform display can be performed between reflective display and transmissive display.

Moreover, in order that the thickness of the liquid crystal layer 12 is changed between the reflective display region R and the transmissive display region T, the insulating layer 48 is not provided in the transmissive display region T, that is, the film thickness of the insulating layer 48 in the transmissive display region T is set to zero. Therefore, as long as this effect is achieved, the film thickness of the insulating layer 48 in the transmissive display region T is not necessarily limited to zero. In summary, what is necessary is just to make the film thickness of the insulating layer 48 in the transmissive display region T smaller than in the reflective display region R, such that the thickness of the liquid crystal layer 12 corresponding to the reflective display region R is smaller than that in the transmissive display region T.

Figure 17:
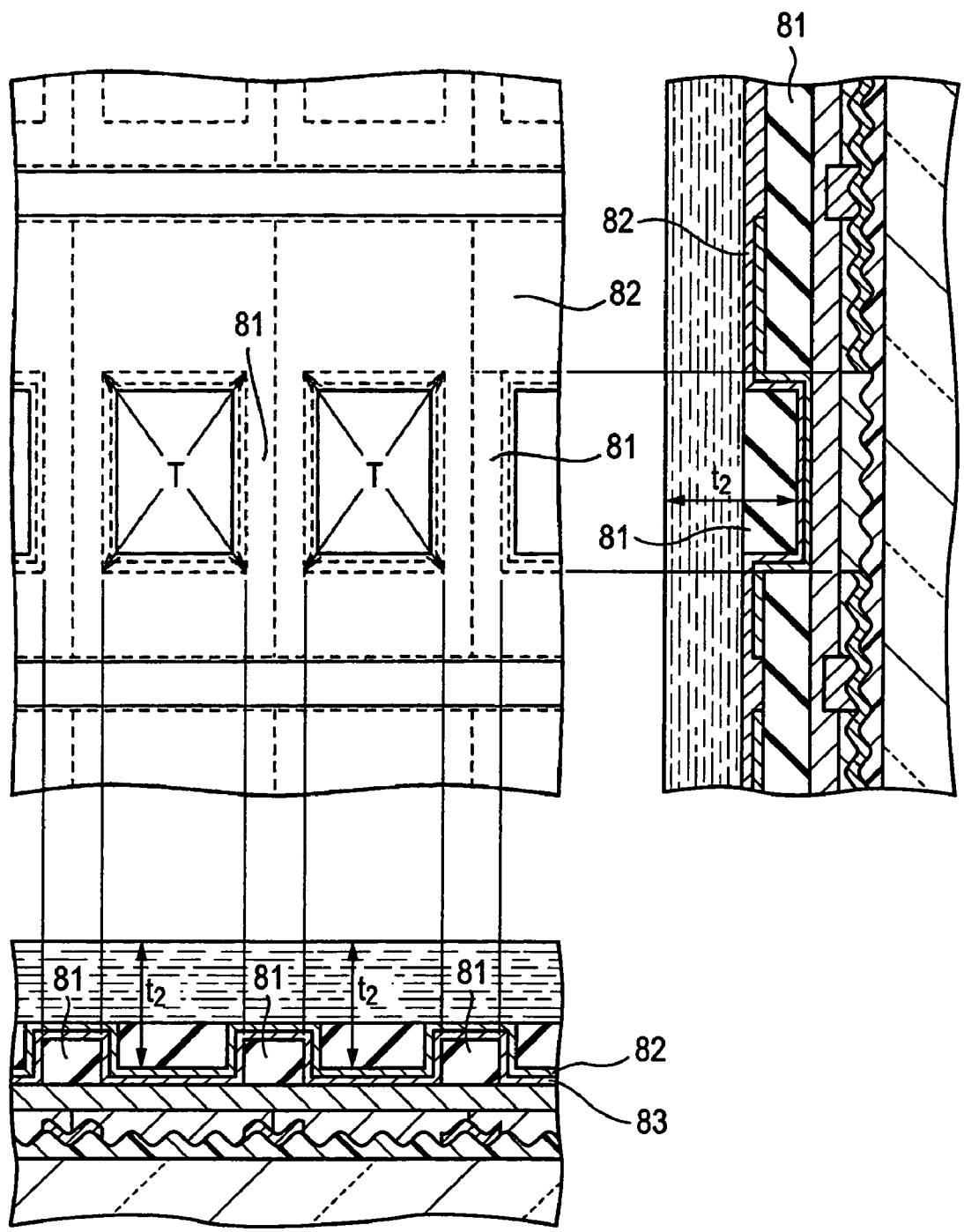
FIG. 17 is a diagram showing essential parts of an example of a related art liquid crystal device.
Figure 18:
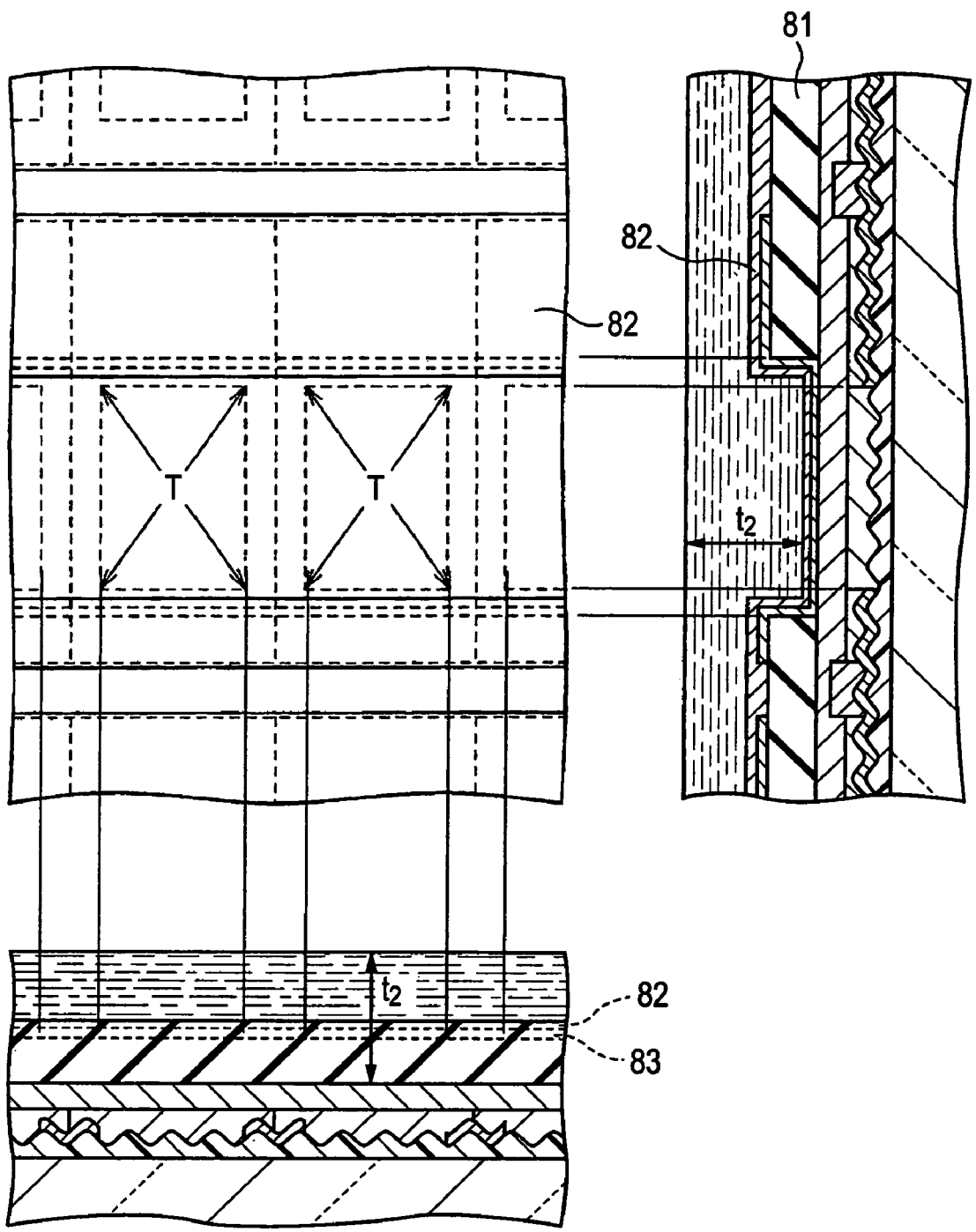
FIG. 18 is a diagram showing essential parts of another example of a related art liquid crystal device.

In such a manner, when the insulating layer 48 is provided, due to presence of the insulating layer 48, the film thickness of the alignment film 26b, which is formed on the insulating layer 48, becomes ununiform among the plurality of transmissive display regions T. This is as described with reference to FIG. 17. Accordingly, in order to avoid this problem, if the insulating layer 48 is set so as not to exist among the plurality of transmissive display regions T, the film thickness of the alignment film 26b can be made uniform. This is as described with reference to FIG. 18. Further, in the configuration of FIG. 18, the film thickness of the alignment film 26b can be made uniform, but the thickness of the liquid crystal layer 12 corresponding to the reflective display region R existing between adjacent transmissive display regions T cannot be set to have the thickness suitable for the reflective display region R. For this reason, display quality may be degraded due to the different in optical path length between reflected light and transmitted light. This was described with reference to FIG. 18. That is, if the insulating layer 48 is provided over the entire boundary portion between adjacent transmissive display regions T (see FIG. 17) or if the insulating layer 48 is removed from the entire boundary portion between adjacent transmissive display regions T (see FIG. 18), display quality was unavoidably degraded.

In contrast, in the present embodiment, as shown in FIGS. 5 and 6, in a portion of the insulating layer 48, a region S where the insulating layer 48 is not formed in a boundary portion between the transmissive display regions T in the row direction X, a region S where the film thickness of the insulating layer is set to zero, or a region S which connects the transmissive display regions T to each other, is partially provided in a portion of the boundary portion. In the present embodiment, the connection region S is provided to correspond to a portion of a long side of the transmissive display region T.

The boundary portion of the transmissive display regions T is the reflective display region R where the light-reflective film 42 is provided, but the portion where the film thickness of the insulating layer 48 is zero is a portion of the boundary portion and the insulating layer 48 having a predetermined film thickness is provided in a remaining boundary portion. Therefore, display quality of reflective display in the boundary portion can be prevented from being degraded.

Moreover, the liquid crystal layer is thicker in the region S where the insulating layer 48 is not formed and the transmissive display regions T are connected to each other. This film thickness is not suitable for the reflective display region R, and thus reflective display in that region may be defective. In order to prevent defective display from being viewed from the outside, in the present embodiment, a light-shielding portion 45 is formed in the color filter layer corresponding to the connection region S. Accordingly, display quality can be prevented from being degraded.

Further, in a portion of the insulating layer 48 formed in the boundary portion of the transmissive display regions T, a portion is provided that causes the height of the insulating layer 48 to be lowered. In the present embodiment, the portion lowers the height of the insulating layer 48 to zero. Accordingly, when the material of the alignment film 26a is coated on the insulating layer 48, flowability of the material between the transmissive display regions T can be ensured. For this reason, the film thickness of the alignment film 26a can be made uniform among the plurality of transmissive display regions T. That is, according to the present embodiment, two demands can be simultaneously satisfied: the thickness of the liquid crystal layer 12 can be adjusted between the reflective display region R and the transmissive display region T by use of the insulating layer 48 as desired, and the alignment film 26a can be formed to have the uniform thickness without being obstructed by the insulating layer 48. Accordingly, reflective display and transmissive display can be performed with the same brightness.

Moreover, when the film thickness of the insulating layer 48 corresponding to the reflective display region R is the first film thickness, the film thickness of the insulating layer 48 corresponding to the transmissive display region T is the second film thickness, and the film thickness of the insulating layer 48 in the boundary portion of adjacent transmissive display regions T is a third film thickness, and, as shown in FIG. 5, when the width of the insulating layer 48 formed to have the third film thickness between adjacent transmissive display regions T is W3, and the widths of the insulating layers 48 formed to have the first film thickness between adjacent transmissive display regions T are W10 and W11, it is preferable to set the insulation layer 48 such that the following conditions are satisfied.

$W3 < W1$, where $W1 = W10 + W11$

If doing so, enhancement of display quality with the adjustment of the thickness of the liquid crystal layer and enhancement of display quality with the formation of the uniform alignment film are effectively compatible.

Further, more preferably, the insulating layer is set to satisfy the condition $W3 < W1/2$. If doing so, enhancement of display quality with the adjustment of the thickness of the liquid crystal layer and enhancement of display quality with the formation of the uniform alignment film are more effectively compatible.

Second Embodiment of Liquid Crystal Device

Figure 7:
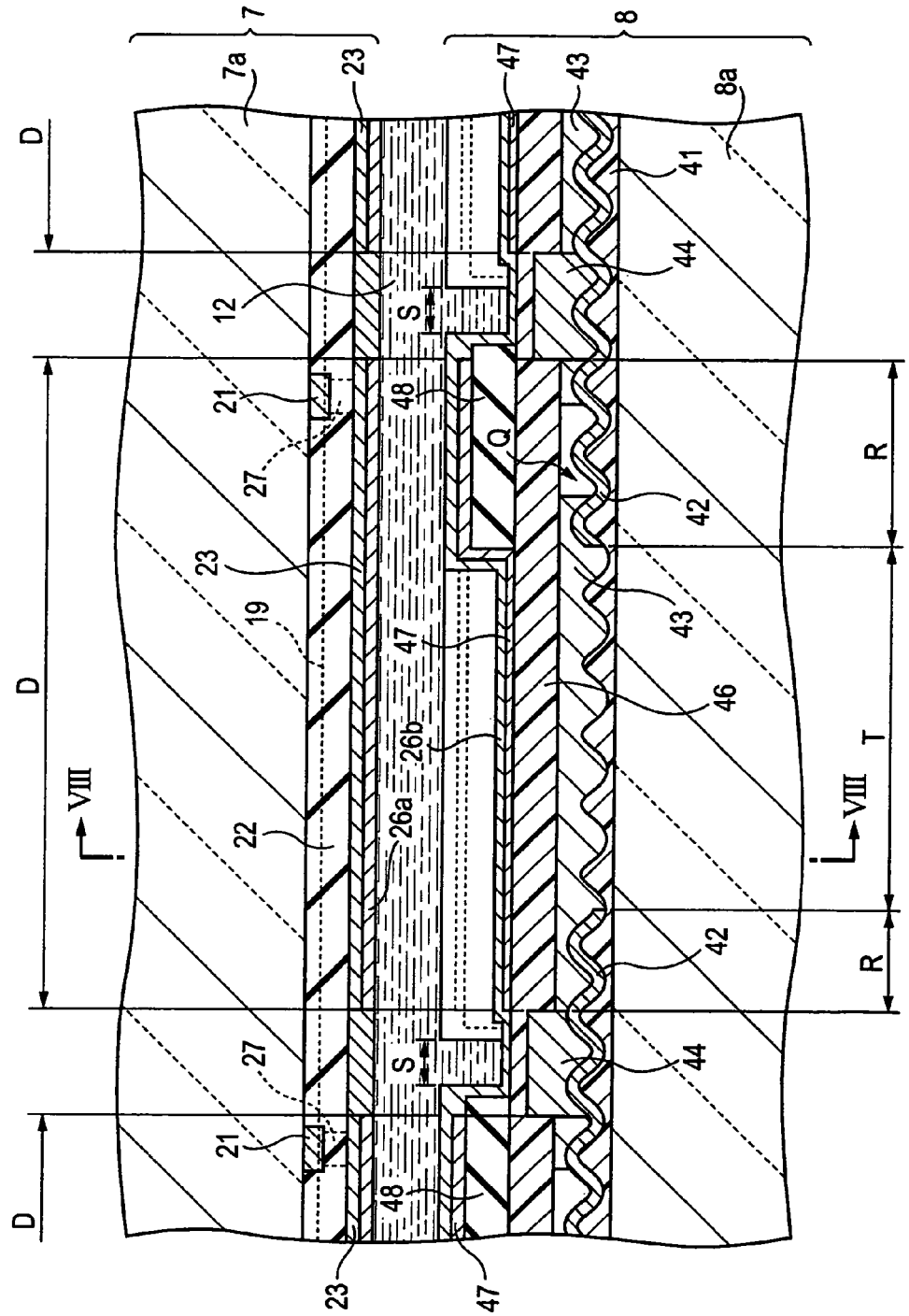
FIG. 7 is a cross-sectional view showing essential parts of another embodiment of a liquid crystal device according to the invention.
Figure 8:
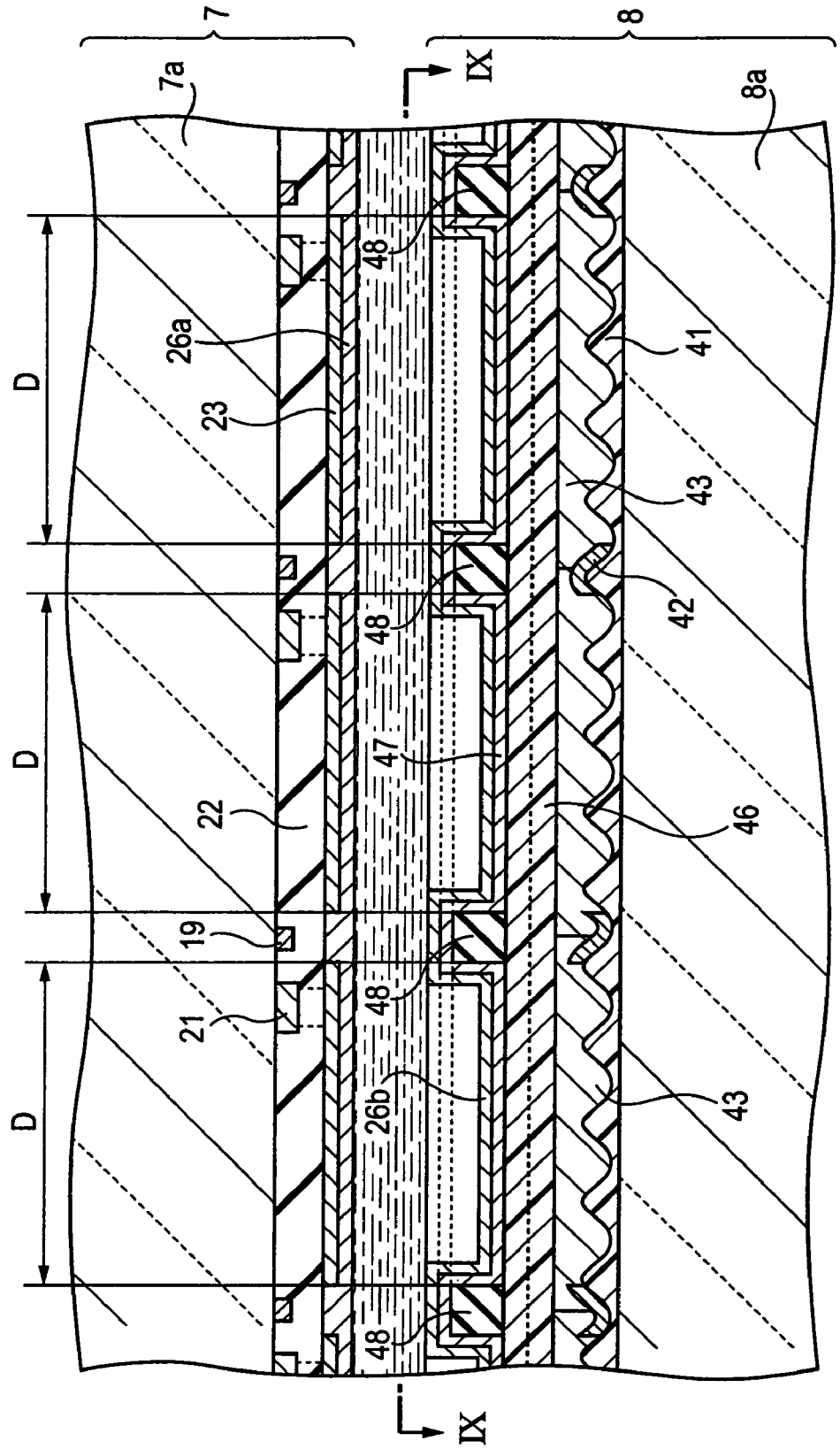
FIG. 8 is a cross-sectional view taken along the line VIII-VIII of FIG. 7.
Figure 9:
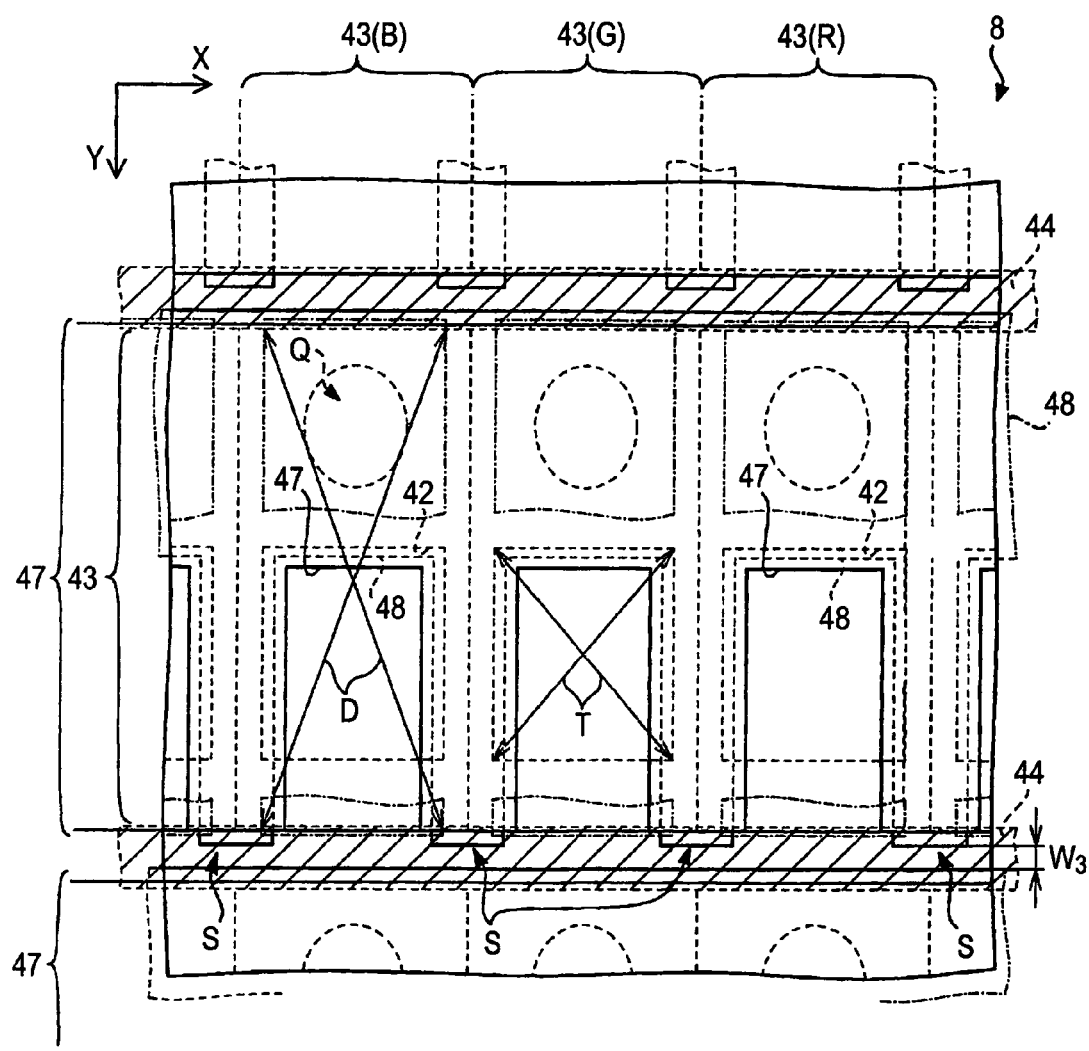
FIG. 9 is a plan cross-sectional view taken along the line IX-IX of FIG. 8.
Figure 10:
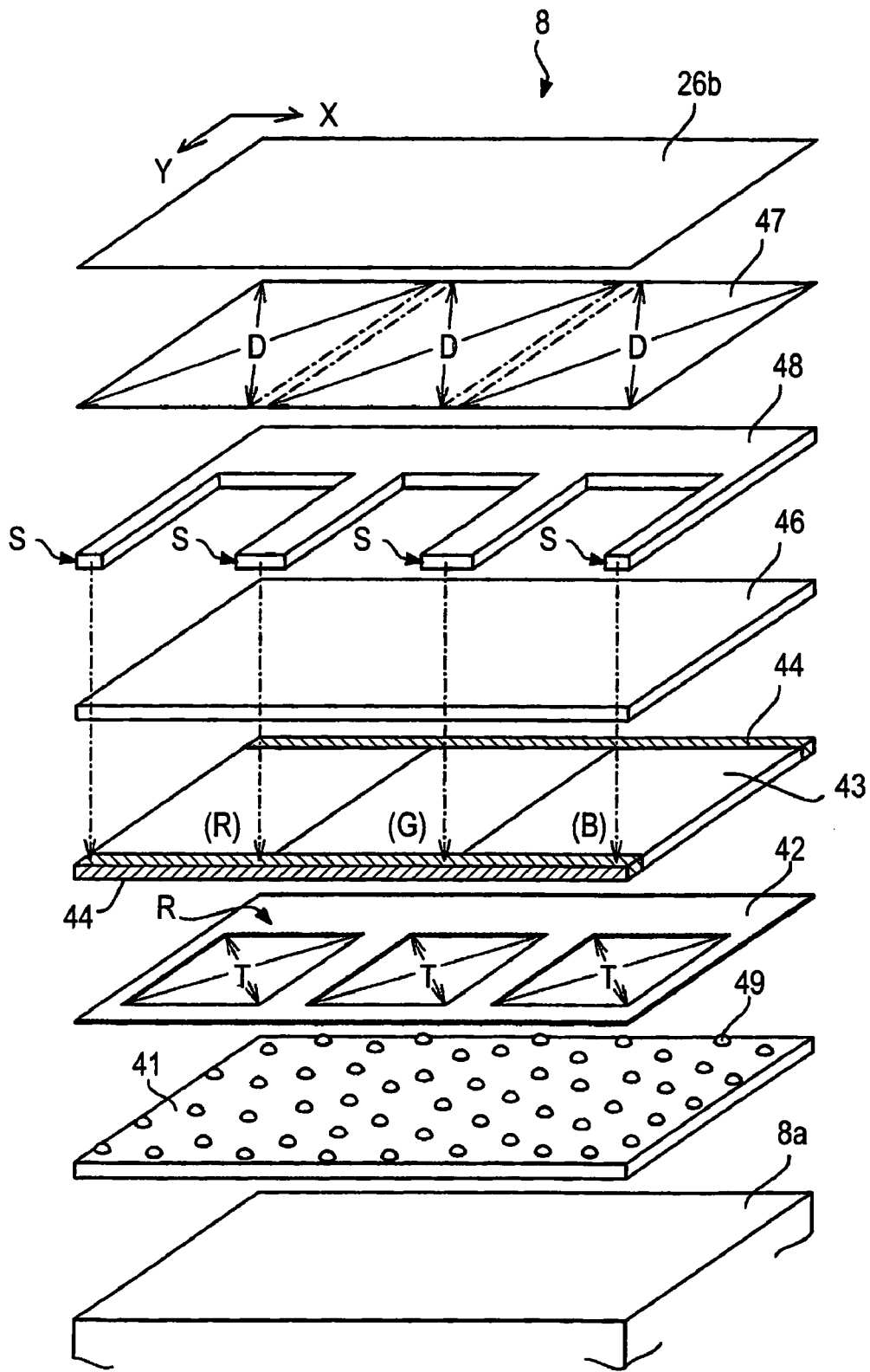
FIG. 10 is a diagram showing a laminated state of individual parts on a color filter substrate used in the embodiment of FIG. 7 in exploded view for ease of understanding.

FIGS. 7 to 10 show essential parts of another embodiment of a liquid crystal device according to the invention. The overall configuration of the present embodiment can be configured to have the same structure as shown in FIGS. 1 and 2. FIG. 7 is a cross-sectional view showing a pixel portion in FIG. 2 on a magnified scale, like FIG. 3 in the above-described embodiment. Further, FIG. 8 is a cross-sectional view taken along the line VIII-VIII of FIG. 7, like FIG. 4 in the above-described embodiment. Further, FIG. 9 is a plan cross-sectional view taken along the line IX-IX of FIG. 8, like FIG. 5 in the above-described embodiment. Further, FIG. 10 is a diagram showing a laminated state of individual parts on a color filter substrate in exploded view for ease of understanding, like FIG. 6 in the above-described embodiment.

Hereinafter, the present embodiment will be described, laying emphasis on different parts from those in the first embodiment. In the present embodiment, the same parts as those in the above-described embodiment are represented by the same reference numerals and the descriptions thereof will be omitted.

In FIG. 7, on the inner surface of the first light-transmissive substrate 7a forming the element substrate 7, the data lines 19, the TFD elements 21, the over-layer 22, the pixel electrodes 23, and the alignment film 26a are formed, like the embodiment of FIG. 3. Further, on the inner surface of the second light-transmissive substrate 8a forming the color filter substrate 8, the resin film 41, the light-reflective film 42, the colored elements 43, and the light-shielding films 44, the overcoat layer 46, the strip-shaped electrodes 47, and the alignment film 26b are formed, like the embodiment of FIG. 3.

As understood through the comparison between FIG. 5 in the above-described embodiment and FIG. 9 in the present embodiment and the comparison between FIG. 6 in the above-described embodiment and FIG. 10 in the present embodiment, in the above-described embodiment, the region S where the insulating layer 48 is not formed, the region S where the film thickness of the insulating layer is set to zero, or the region S which connects the transmissive display regions T to each other with a low insulating layer is provided on the middle of the long side of the transmissive display region T. In contrast, in the present embodiment, a region S which connects the transmissive display regions T with a low insulating layer is formed in a boundary portion of adjacent subpixel regions D in the column direction Y, separately from the transmissive display region T.

In this embodiment, a connection region S where the film thickness of the insulating layer 48 is small is provided between the transmissive display regions T, and thus, when the alignment film 26b is formed on the insulating layer 48, flowability of the material of the alignment film 26b can be ensured. Moreover, in FIG. 9, the alignment film 26b is not shown. Further, in a portion other than the connection region S, the insulating layer 48 having a large film thickness is provided, and thus an optical path length of reflected light, which is reflected by that portion and passes through the liquid crystal layer two times, can be set to have a suitable length.

Moreover, in the embodiment of FIG. 5, in order to hide defective display occurring in the connection region S from the outside, a light-shielding portion 45 is formed in a portion overlapping the connection region S in plan view. As regards this configuration, in the present embodiment shown in FIG. 9, the connection region S is provided between adjacent subpixel regions D in the column direction Y, and the light-shielding film 44 is formed in that region in advance. Therefore, conveniently, the light-shielding portion for hiding the connection region S does not need to be additionally provided.

Third Embodiment of Liquid Crystal Device

FIGS. 11 to 14 show essential parts of still another embodiment of a liquid crystal device according to the invention. The present embodiment relates to an active matrix-type liquid crystal device using a TFT (Thin Film Transistor) element, which is a three-terminal-type active element, as a switching element. Moreover, as the TFT element, various kinds of TFTs, such as an amorphous silicon TFT, a low-temperature polysilicon TFT, a high-temperature polysilicon TFT, or the like, may be used. In the present embodiment, it is assumed that the amorphous silicon TFT is used. Of course, the invention can be applied to a liquid crystal device which uses other kinds of TFTs.

Figure 11:
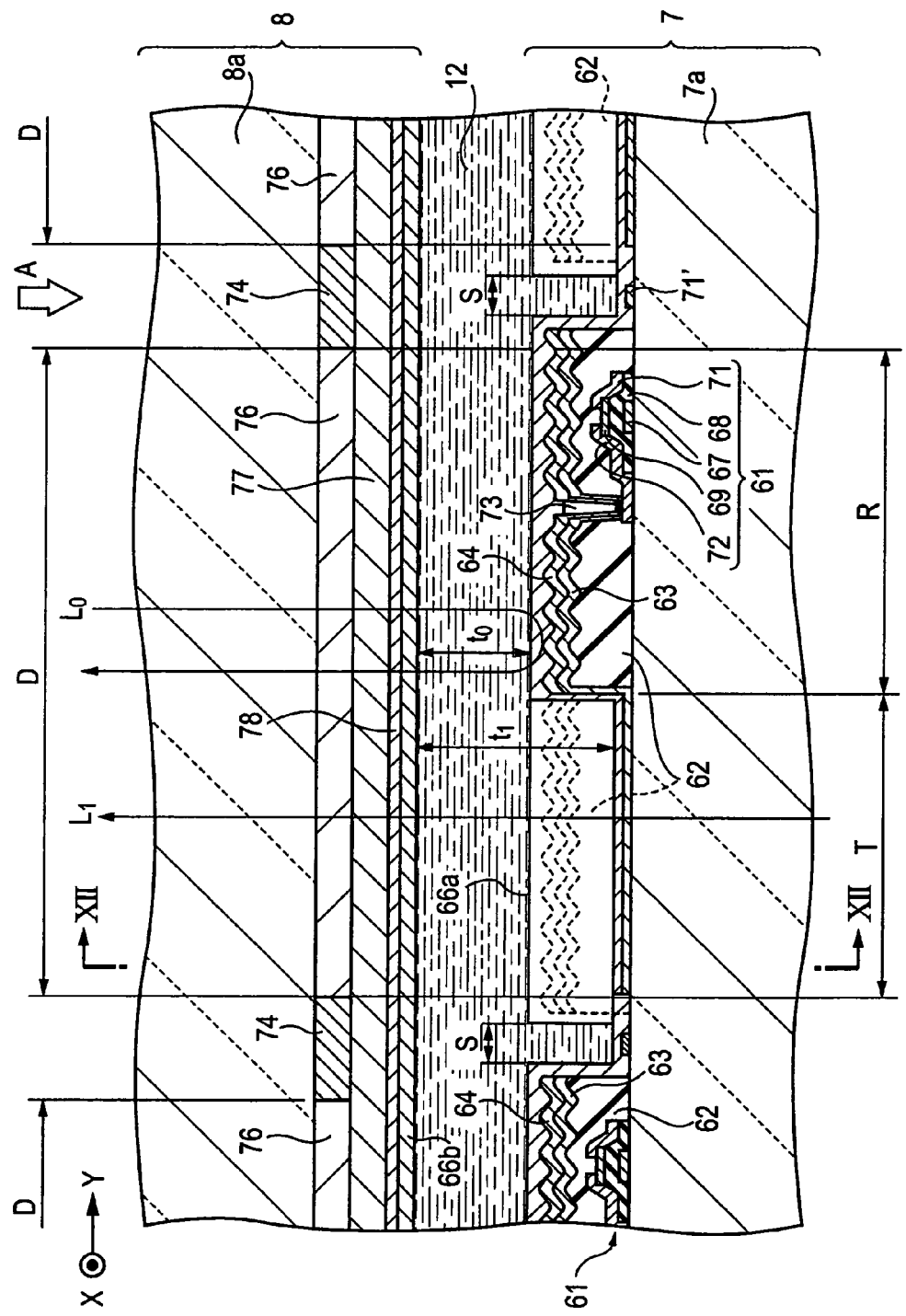
FIG. 11 is a cross-sectional view showing essential parts of still another embodiment of a liquid crystal device according to the invention.
Figure 12:
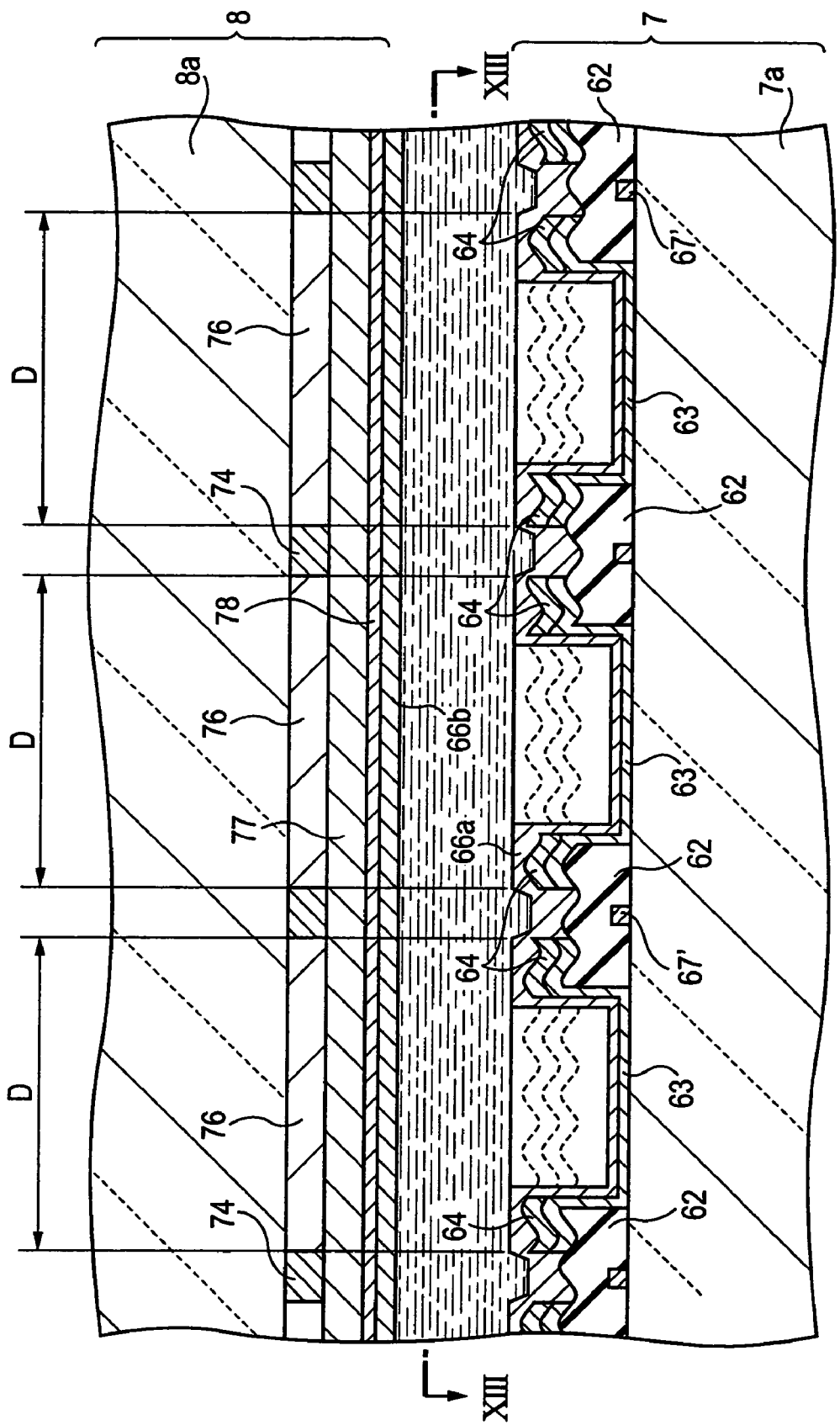
FIG. 12 is a cross-sectional view taken along the line XII-XII of FIG. 11.
Figure 13:
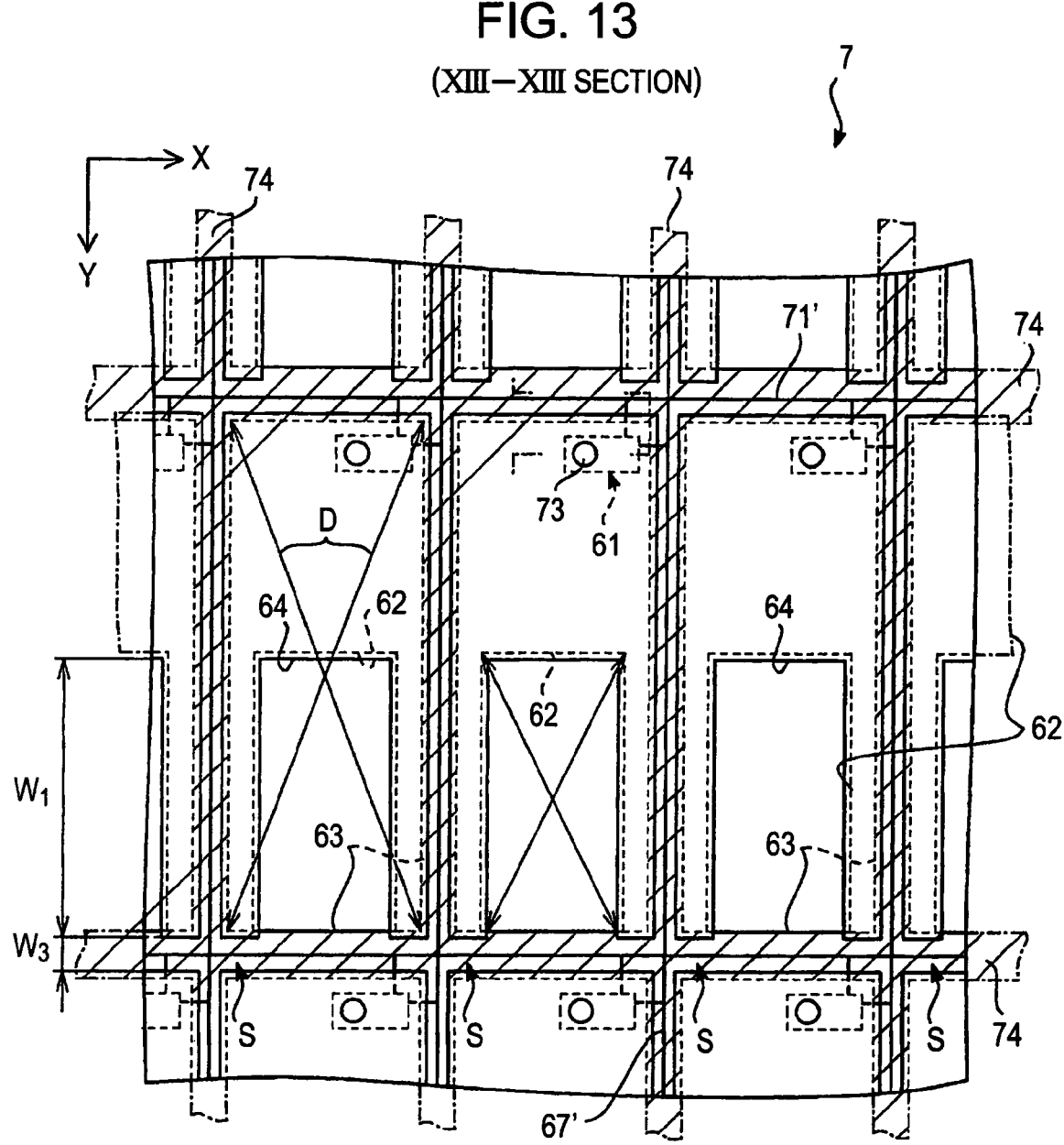
FIG. 13 is a plan cross-sectional view taken along the line XIII-XIII of FIG. 12.
Figure 14:
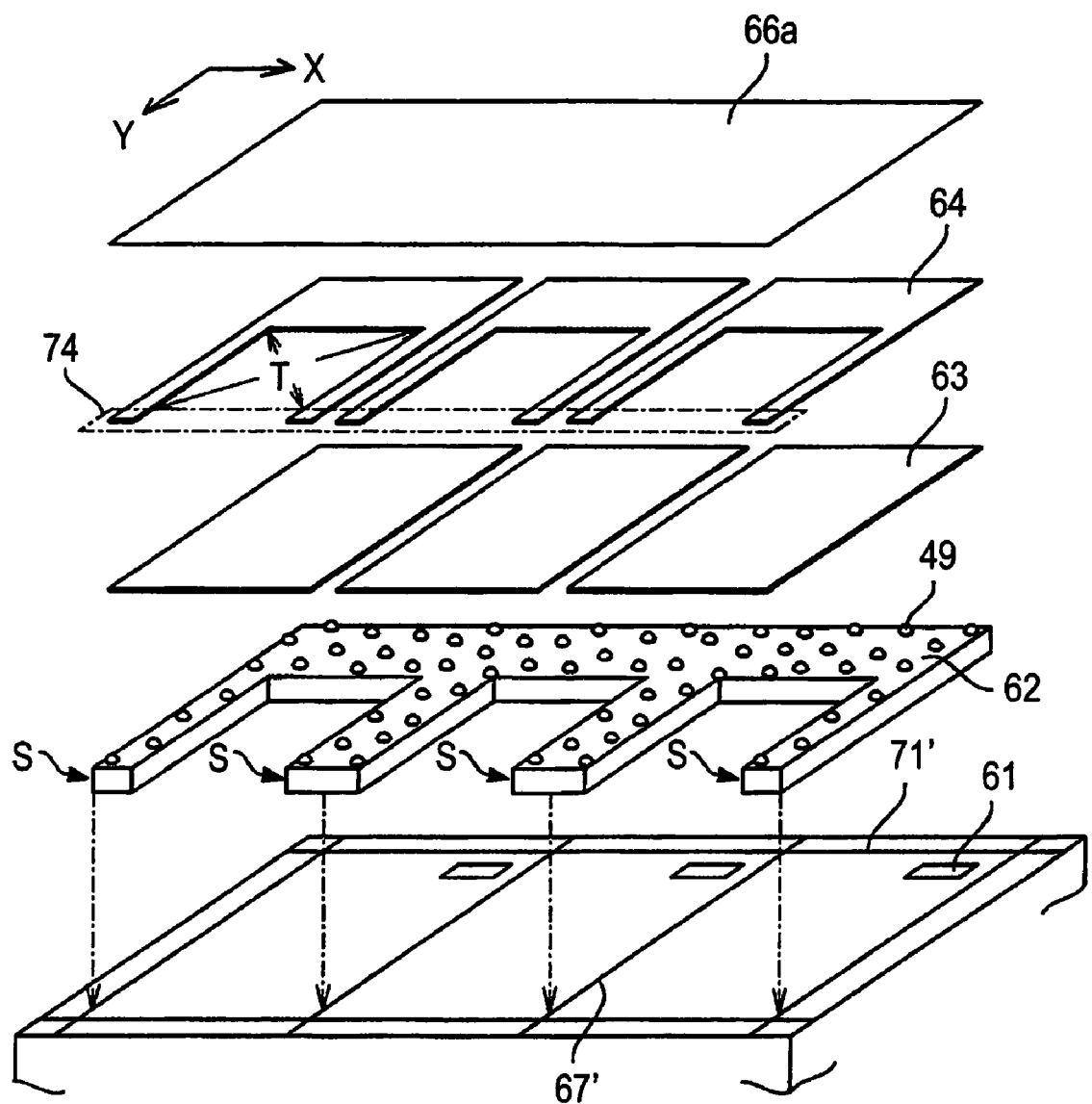
FIG. 14 is a diagram showing a laminated state of individual parts on an element substrate used in the embodiment of FIG. 11 in exploded view for ease of understanding.

The overall configuration of the present embodiment can be configured to have the same structure as shown in FIG. 1 or 2. FIG. 11 is a cross-sectional view showing a pixel portion in FIG. 2 on a magnified scale, like FIG. 3 in the above-described embodiment. Further, FIG. 12 is a cross-sectional view taken along the line XII-XII of FIG. 11, like FIG. 4 in the above-described embodiment. Further, FIG. 13 is a plan cross-sectional view taken along the line XIII-XIII of FIG. 12, like FIG. 5 in the above-described embodiment. Further, FIG. 14 is a diagram showing a laminated state of individual parts on an element substrate in exploded view for ease of understanding.

Hereinafter, the present embodiment will be described, laying emphasis on different parts from those in the first embodiment. In the present embodiment, the same parts as those in the above-described embodiment are represented by the same reference numerals and the descriptions thereof will be omitted.

In FIG. 11, on the inner surface of the first light-transmissive substrate 7a forming the element substrate 7, a plurality of TFT elements 61 serving as active elements or switching elements, a resin scattering film 62 serving as an insulating layer, pixel electrodes 63, a light-reflective film 64, and an alignment film 66a are sequentially formed. The alignment film 66a is subjected to an alignment treatment, for example, a rubbing treatment, such that the alignment of the liquid crystal molecules in the vicinity of the alignment film 66a is determined.

Each of the TFT elements 61 used in the present embodiment is the amorphous silicon TFT, and the TFT element 61 has a gate electrode 67, a gate insulating film 68, a semiconductor layer 69 that is formed of a-Si (amorphous silicon), a source electrode 71, and a drain electrode 72. One end of the drain electrode 72 is connected to the semiconductor layer 69, and the other end thereof is connected to the corresponding pixel electrode 63 through a contact hole 73. The source electrode 71 is formed as a portion of a source electrode line 71', which extends in the direction perpendicular to the paper of FIG. 11. Further, the gate electrode 67 extends from a gate electrode line 67', which extends in a direction perpendicular to the source electrode line 71', that is, in a horizontal direction of FIG. 11 (see FIGS. 13 and 12).

The resin scattering film 62 serving as the insulating layer has a light-scattering concavo-convex pattern on its surface. Further, the resin scattering film 62 also functions as a liquid-crystal-layer thickness adjusting layer for adjusting the thickness of the liquid crystal layer 12 between the reflective display region R and the transmissive display region T. Hereinafter, the resin scattering film and the insulating layer are represented by the same reference numeral 62. A plurality of pixel electrodes 63 are formed in dot shapes by photo-etching a material, for example, ITO, and are arranged in a matrix shape in vertical and horizontal directions as viewed from the direction of the arrow A. The alignment film 66a is formed by coating and firing a polyimide solution or by offset printing.

In FIG. 11, on the inner surface of the second light-transmissive substrate 8a forming the color filter substrate 8, a light-shielding member 74 is formed in a lattice shape, as indicated by an oblique line in FIG. 13, as viewed from the direction of the arrow A. Further, colored elements 76 are formed in a plurality of regions surrounded by the light-shielding member 74, an overcoat layer 77 is formed thereon, a common electrode 78 is formed thereon, and then an alignment film 66b is formed thereon. The alignment film 66b is subjected to an alignment treatment, for example, a rubbing treatment, such that the alignment of the liquid crystal molecules in the vicinity of the alignment film 66b is determined.

In the present embodiment, a region where the pixel electrode 63 and the common electrode 78 overlap each other forms the subpixel region D. Further, a plurality of subpixel regions D are arranged in a matrix shape as viewed from the direction of the arrow A so as to form the display region V of FIG. 1, and images are displayed on the display region V. As understood from FIGS. 11, 12, and 13, the light-shielding member 74 on the color filter substrate 8 is provided to overlap intervals, which extend in the row direction X and the column direction Y among the plurality of subpixel regions D, in plan view. The light-shielding member 74 functions a black matrix for enhancing display contrast.

In the present embodiment, as shown in FIGS. 13 and 14, the resin scattering film 62 for forming the light-scattering concavo-convex pattern in the light-reflective film 64 functions as the insulating layer. That is, the resin scattering film 62 having a predetermined film thickness is provided in the reflective display region R where the light-reflective film 64 is provided, such that the thickness t0 of the liquid crystal layer 12 in the reflective display region R is set small. On the other hand, the resin scattering film 62 is not provided in the transmissive display region T where the light-reflective film 64 is not provided, that is, the film thickness of the insulating layer 62 is set to zero, such that the thickness t1 of the liquid crystal layer 12 in the transmissive display region T is set larger than t0, that is, the condition t1>t0 is established. Accordingly, an optical path length when external light L0 reflected by the reflective display region R passes through the liquid crystal layer 12 and an optical path length when transmitted light L1 transmitting the transmissive display region T passes through the liquid crystal layer 12 are equal or close to each other.

In the present embodiment, the insulating layer 62 is not formed, that is, the film thickness of the insulating layer 62 is set to zero, and the region S, which connects the transmissive display regions T with the low insulating layer 62, is formed in the boundary portion between adjacent subpixel regions D in the column direction Y, separately from the transmissive display region T. This is the same as the embodiment shown in FIGS. 7, 9, and 10. As such, in the present embodiment, the connection region S where the film thickness of the insulating layer 62 is small is provided between the transmissive display regions T, and thus, when the alignment film 66a is formed on the insulating layer 62, flowability of the material of the alignment film 66a can be ensured. Further, in the portion other than the connection region S, the insulating layer 62 having a large film thickness is provided, and thus the optical path length of reflected light, which is reflected by that portion and passes through the liquid crystal layer two times, can be set to a suitable length.

As shown in FIG. 13, the region S where the insulating layer 62 has the small film thickness so as to connect the transmissive display regions T is provided in the interval between adjacent subpixel regions D in the column direction Y. Further, on the portion of the counter substrate facing that region, that is, the color filter substrate, the light-shielding film 74 is formed in advance. The region S is a region in which display is concerned to be disordered, since the film thickness of the insulating layer 62 is small. However, since this region is hidden from the outside by the light-shielding film 74, display quality can be prevented from being degraded. Further, the light-shielding film 74 is formed for a black matrix in order to prevent light from leaking from the interval between the subpixel regions D, which is not particularly provided to shield the connection region S. Therefore, according to the present embodiment, a dedicated light-shielding film does not need to be provided in order to shield the connection region S, and thus material costs and manufacturing costs can be suppressed low.

Other Embodiments on Liquid Crystal Device

In FIG. 3, when the film thickness of the insulating layer 48 corresponding to the reflective display region R is the first film thickness, the film thickness of the insulating layer 48 corresponding to the transmissive display region T is the second film thickness, and the film thickness of the insulating layer 48 in the connection region S provided in the boundary portion adjacent transmissive display regions T in the row direction X (that is, the direction perpendicular to the paper in FIG. 3) is the third film thickness, in the third embodiment, the first film thickness is set to a predetermined thickness, and the second film thickness and the third film thickness are set to zero. However, this configuration is just an example, the second film thickness and the third film thickness can have the same value, which is smaller than the first film thickness, excluding zero, or can have difference values, which are smaller than the first film thickness, excluding zero.

Embodiments of Electronic Apparatus

Hereinafter, an electronic apparatus according to the invention will be described by way of embodiments. Moreover, the embodiments are examples of the invention, and the invention is not limited to the embodiments.

Figure 15:
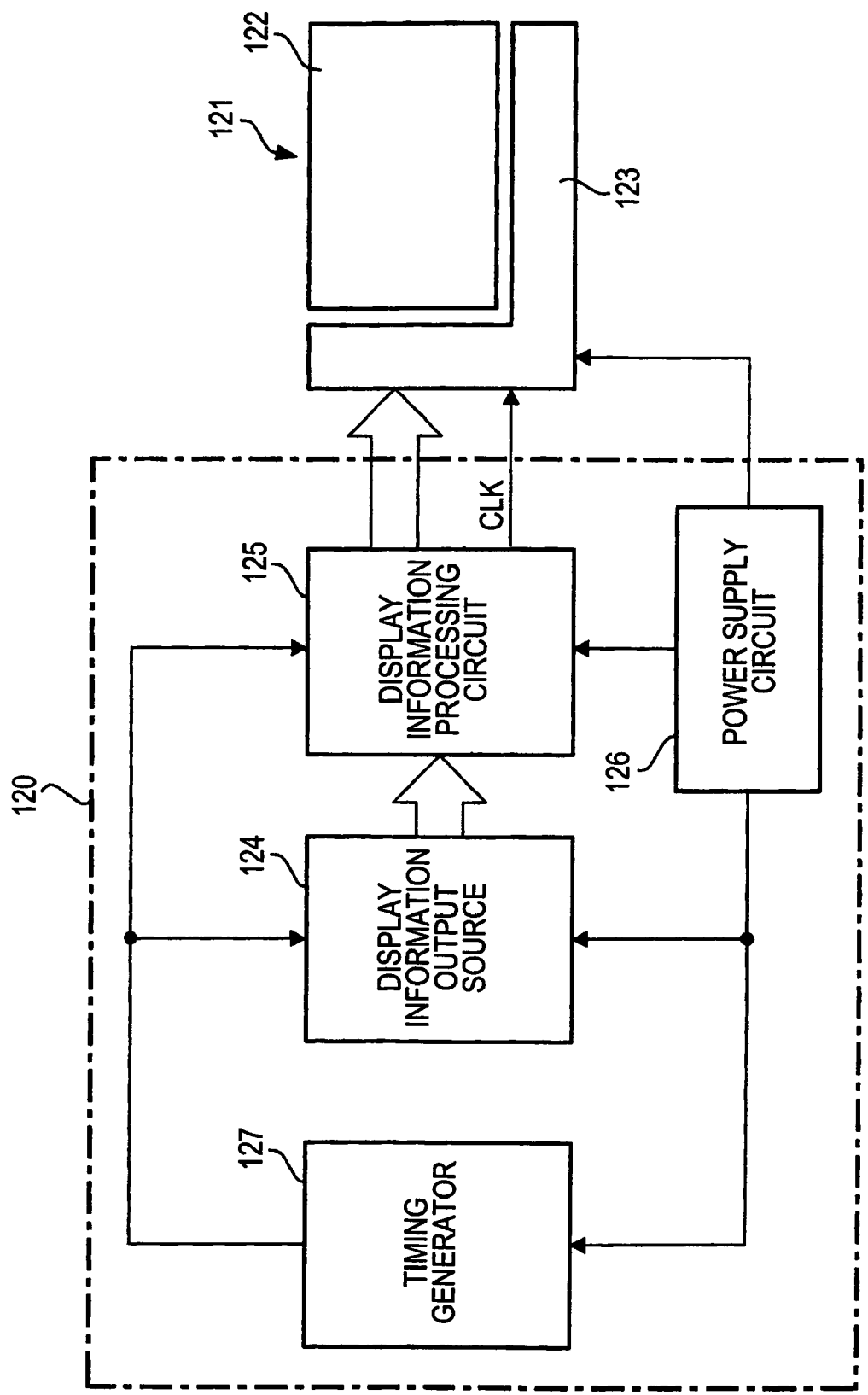
FIG. 15 is a block diagram showing an embodiment of an electronic apparatus according to the invention.

FIG. 15 shows an embodiment of an electronic apparatus according to the invention. An electronic apparatus shown in FIG. 15 has a liquid crystal device 121 and a control circuit 120 that controls the liquid crystal device 121. The control circuit 120 includes a display information output source 124, a display information processing circuit 125, a power supply circuit 126, and a timing generator 127. Further, the liquid crystal device 121 has a liquid crystal panel 122 and a driving circuit 123.

The display information output source 124 includes a memory, such as the RAM (Random Access Memory) or the like, a storage unit, such as various discs or the like, and a tuning circuit that synchronously outputs digital image signals. The display information output source 124 supplies display information, such as an image signal of a predetermined format or the like, to the display information processing circuit 125 on the basis of various clock signals generated by the timing generator 127.

Next, the display information processing circuit 125 includes a plurality of known circuits, such as an amplification/inversion circuit, a rotation circuit, a gamma correction circuit, a clamping circuit, and the like. The display information processing circuit 125 processes the input display information and supplies the image signals to the driving circuit 123, together with a clock signal CLK. Here, the driving circuit 123 is the general term for a scanning line driving circuit, a data line driving circuit, a test circuit, and the like. Further, the power supply circuit 126 supplies predetermined power supply voltages to the individual parts described above.

The liquid crystal device 121 can be formed by use of the liquid crystal device 1 shown in FIG. 1, for example. According to the liquid crystal device 1, a function of adjusting the thickness of the liquid crystal layer can be sufficiently achieved by using the insulating layer between the reflective display region and the transmissive display region, and the alignment film can be formed on the surface of the insulating layer to have the uniform thickness, even when the thickness of the insulating layer differs between the reflective display region and the transmissive display region. For this reason, reflective display and transmissive display in the transflective liquid crystal device can be performed with uniform display quality and high display quality. Therefore, in an electronic apparatus having the liquid crystal device 1, reflective display and transmissive display in a display unit can be performed with uniform display quality and high display quality.

Figure 16:
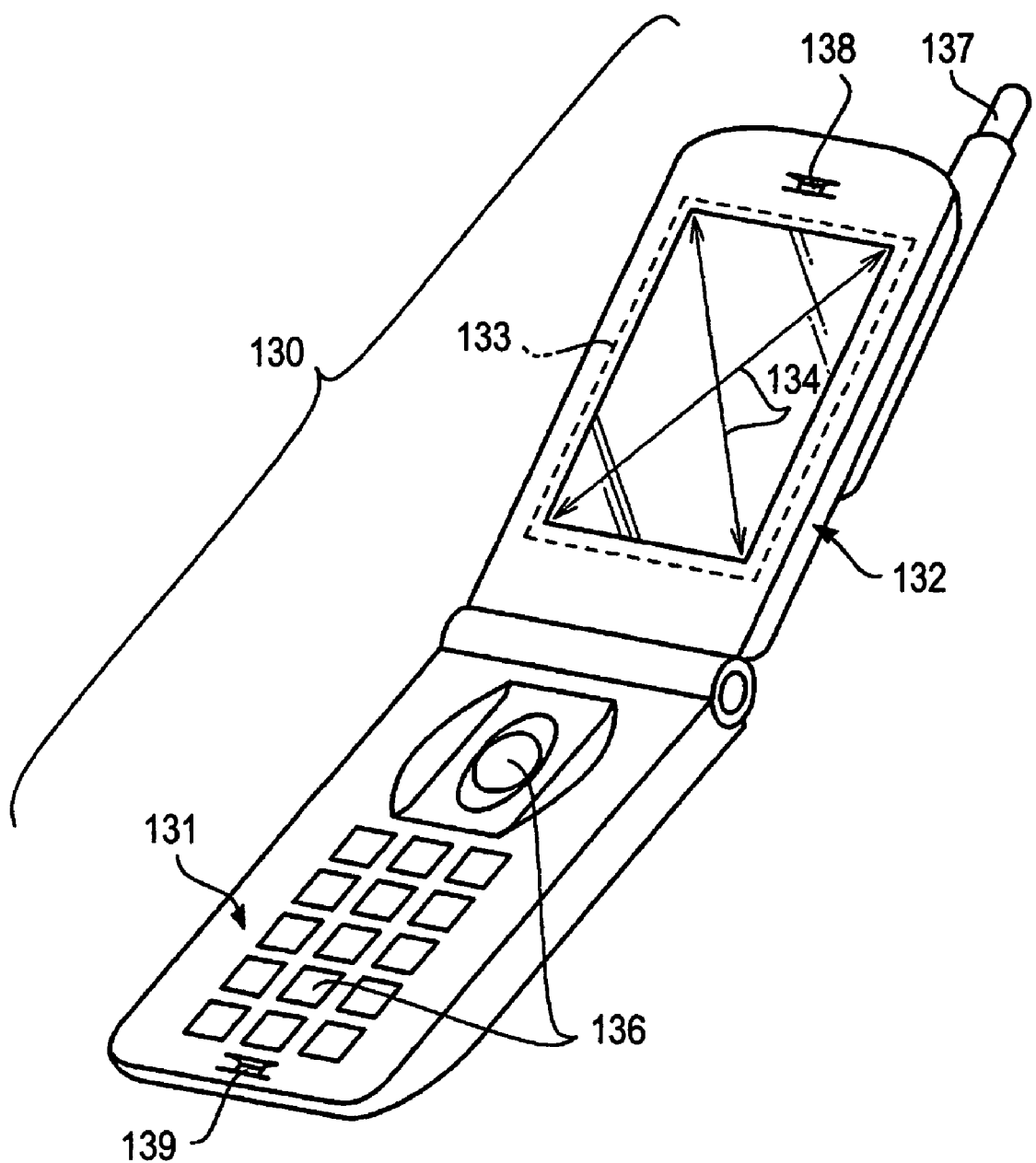
FIG. 16 is a perspective view showing another embodiment of an electronic apparatus according to the invention.

Next, FIG. 16 shows a cellular phone which is another embodiment of an electronic apparatus according to the invention. A cellular phone 130 shown in FIG. 16 has a main body 131 and a display unit 132 that is openably provided in the main body 131. A display device 133, which has an electro-optical device, such as a liquid crystal device or the like, is disposed in the display unit 132, and various kinds of display on telephone communication can be viewed through a display screen 134 in the display unit 132. In the main body 131, operating buttons 136 are arranged.

At one end of the main body 132, an antenna 137 is retractably attached. In a receiver 138 provided at the top of the display unit 132, a speaker (not shown) is provided. Further, in a transmitter 139 provided at a lower end of the main body 131, a microphone (not shown) is incorporated. A control unit that controls the operation of the display device 133 is housed in the main body 131 or the display unit 132 as a part of a control unit that control the entire cellular phone or separately from the control unit.

The display device 133 can have the liquid crystal device 1 shown in FIG. 1. According to the liquid crystal device 1, a function of adjusting the thickness of the liquid crystal layer can be sufficiently achieved by using the insulating layer between the reflective display region and the transmissive display region, and the alignment film can be formed on the surface of the insulating layer to have the uniform thickness, even when the thickness of the insulating layer differs between the reflective display region and the transmissive display region. For this reason, reflective display and transmissive display in the transflective liquid crystal device can be performed with uniform display quality and high display quality. Therefore, in the cellular phone 130 having the liquid crystal device 1, reflective display and transmissive display in a display unit can be performed with uniform display quality and high display quality.

MODIFICATION

Moreover, as the electronic apparatus, in addition to the cellular phone described above, a personal computer, a liquid crystal television, a viewfinder-type or monitor-direct-view-type video tape recorder, a car navigation device, a pager, an electronic organizer, an electronic calculator, a word processor, a workstation, a video phone, a POS terminal, or the like can be exemplified.

The entire disclosure of Japanese Patent Application No. 2005-090716, filed Mar. 28, 2005, is expressly incorporated by reference herein.

What is claimed is:

1. A liquid crystal device comprising:
a pair of substrates that face each other;
a liquid crystal layer that is interposed between the pair of substrates;
electrodes that form a plurality of subpixel regions, each subpixel region including a reflective display region having a light-reflective film reflecting light and a transmissive display region transmitting light; and
an insulating layer disposed between one of the pair of substrates and the liquid crystal layer, the insulating layer rendering the liquid crystal layer to a smaller thickness in the reflective display region than in the transmissive display region, the insulating layer having a first film thickness in the reflective display region, the insulating layer being disposed in an inter-transmissive display region between the transmissive display region of a predetermined subpixel region and the transmissive display region of a subpixel region adjacent to the predetermined subpixel region, the insulating layer at the inter-transmissive display region including a portion that is thinner than the first film thickness.

2. The liquid crystal device according to claim 1,
wherein the insulating layer is not provided in the transmissive display region.

3. The liquid crystal device according to claim 1,
wherein the liquid crystal layer at the portion of the insulating layer that is thinner than the first film thickness has substantially the same thickness as the liquid crystal layer in the transmissive display region.

4. The liquid crystal device according to claim 3,
wherein the insulating layer includes a non formation portion at the portion of the insulating layer that is thinner than the first film thickness.

5. The liquid crystal device according to claim 1,
wherein another portion of the insulating layer at the inter-transmissive display region has the first film thickness.

6. The liquid crystal device according to claim 1, further comprising a light-shielding film that shields the portion of the insulating layer that is thinner than the first film thickness.

7. The liquid crystal device according to claim 1,
wherein the transmissive display region is elongated in one direction in plan view, and the portion of the insulating layer that is thinner than the first film thickness is at a side in the one direction.

8. The liquid crystal device according to claim 6,
wherein the transmissive display region extends in a predetermined direction through the portion of the insulating layer that is thinner than the first film thickness, and a light-shielding film is provided between adjacent sub-pixel regions in a direction crossing the predetermined direction.

9. The liquid crystal device according to claim 1,
wherein a resin film is formed below the light-reflective film, the a resin film having a concavo-convex pattern that causes a surface of the light-reflective film to have concavo-convexes, the insulating layer being formed from the resin film.

10. The liquid crystal device according to claim 1,
wherein the condition $W3<W1$ is established,
W3 is a width of the insulating layer in the portion of the insulating layer that is thinner than the first film thickness in a longitudinal direction of the transmissive display region, and
W1 is a width of the insulating layer at the inter-transmissive display region in the longitudinal direction of the transmissive display region.

11. The liquid crystal device according to claim 1,
wherein the condition $W3<W1/2$ is established, W3 is a width of the insulating layer in the portion of the insulating layer that is thinner than the first film thickness in a longitudinal direction of the transmissive display region, and
W1 is a width of the insulating layer at the inter-transmissive display region in the longitudinal direction of the transmissive display region.

12. An electronic apparatus comprising the liquid crystal device according to claim 1.

* * * * *